United States Patent [19]

Satoh et al.

[11] 4,357,389

[45] Nov. 2, 1982

[54] POLYMER DOPE COMPOSITION, COMPOSITE FIBERS MADE THEREFROM AND PROCESS FOR MAKING SAME

[75] Inventors: Eiji Satoh; Tetsuo Matsushita; Atsushi Ishida; Tamio Ishitobi; Shigemitsu Muraoka, all of Nobeoka, Japan

[73] Assignee: Asahi Kasei Kogyo Kabushiki Kaisha, Japan

[21] Appl. No.: 185,435

[22] Filed: Sep. 9, 1980

[30] Foreign Application Priority Data

Sep. 10, 1979 [JP] Japan ................................. 54-115131

[51] Int. Cl.$^3$ .............................................. D02G 3/00
[52] U.S. Cl. .................................... 428/373; 428/364; 428/372
[58] Field of Search ............... 428/364, 372, 373, 374; 264/182; 260/DIG. 23, DIG. 32; 521/149; 525/203

[56] References Cited

U.S. PATENT DOCUMENTS 2,901,813  9/1959  Schappel .......................... 428/364 X
3,575,898  4/1971  McClure ........................ 260/17 R X

FOREIGN PATENT DOCUMENTS 31-968   2/1956  Japan .
33-2317  4/1958  Japan .
37-1470  5/1962  Japan .
39-14029 7/1964  Japan .
43-4023  5/1968  Japan .

OTHER PUBLICATIONS

Cates et al., "Preparation and Properties of Fibers Containing Mixed Polymers, I. Polyacrylonitrile–Cellulose Acetate Fibers," Journal of Polymer Science, vol. XX, pp 155–180, (1956).

Primary Examiner—Lorraine T. Kendell
Attorney, Agent, or Firm—Finnegan, Henderson, Farabow, Garrett & Dunner

[57] ABSTRACT

There is provided a shaping composite dope composition comprising a cellulose derivative, an acrylonitrile polymer and a solvent capable of substantially dissolving these polymeric materials simultaneously therein, and exhibiting flow birefringence or optical anisotropy. A composite fiber made from the dope has a strucute such that the cellulose derivative is present in the form of a dispersed phase of fine fibers in a matrix of the acrylonitrile polymer, the crystalline orientation angle of the acrylonitrile polymer phase is 18° to 63° as measured by wide angle X-ray diffractiometry, and the ratio of the crystalline orientation angle of the cellulose derivative phase to the crystalline orientation angle of the acrylonitrile polymer phase satisfies a specified requirement. The composite fiber is excellent in the thermal dimensional stability and mechanical properties, such as tensile strength and tensile elongation and loop strength and loop elongation.

10 Claims, 19 Drawing Figures

POLYMER DOPE COMPOSITION, COMPOSITE FIBERS MADE THEREFROM AND PROCESS FOR MAKING SAME

BACKGROUND OF THE INVENTION (1) Field of the Invention

The present invention relates to a novel shaping dope composition comprising at least one cellulose derivative, at least one acrylonitrile polymer and a solvent capable of substantially dissolving these polymeric materials simultaneously therein. The invention also relates to novel composite fibers comprising a cellulose derivative and an acrylonitrile polymer, which are made from such dope composition and are excellent in the thermal dimensional stability and mechanical properties, in which the cellulose derivative is present in the form of a dispersed phase of fine fibers in a matrix of the acrylonitrile polymer.

(2) Description of the Prior Art

A dope comprising a cellulose derivative and an acrylonitrile polymer dissolved in a common solvent is known. It also is known that phase separation takes place in such dope. For example, Cates: J. Polymer Sci., 20, 155 (1966), Japanese Patent Publication No. 968/56 and Japanese Patent Publication No. 2,317/58 teach a dope comprising cellulose acetate and an acrylonitrile polymer dissolved in N,N-dimethylformamide or dimethylsulfoxide. Japanese Patent Publication No. 2,986/62 teaches a dope comprising cellulose acetate and an acrylonitrile polymer dissolved in a concentrated aqueous solution of an inorganic salt. It also is taught that these dopes can be used for formation of fibers. Furthermore, Japanese Patent Publication No. 4,023/58 discloses a dope composition formed by dissolving cyanoethyl cellulose and an acrylonitrile polymer in N,N-dimethylformamide and Japanese Patent Publication No. 14,029/64 teaches that phase separation takes place in dope compositions formed by dissolving a cellulose derivative such as mentioned above and an acrylonitrile polymer in a solvent.

SUMMARY OF THE INVENTION

While the inventors of the present invention were conducting research on dopes comprising cellulose derivatives, acrylonitrile polymers and solvents, it was accidentally found that such dopes show a flow birefringence or optical anisotropy at a certain dope concentration range. It also was found that dope compositions showing such characteristic are very excellent in shapeability, and that fibers and other shaped articles prepared from such dopes are especially excellent in the dimensional stability under high temperature and wet conditions, and in mechanical properties.

More specifically, in accordance with one aspect of the present invention, there is provided a composite dope composition comprising at least one cellulose derivative, at least one acrylonitrile polymer and a solvent capable of substantially dissolving these polymeric materials simultaneously therein, said dope showing a flow birefringence or optical anisotropy.

In accordance with another aspect of the present invention, there is provided a composite fiber excellent in the thermal dimensional stability and mechanical properties, such as tensile strength and elongation, and loop strength and elongation, which comprises at least one cellulose derivative and at least one acrylonitrile polymer, wherein the cellulose derivative is present in the form of a dispersed phase of fine fibers in a matrix of the acrylonitrile polymer, the crystalline orientation angle of the acrylonitrile polymer phase is 18° to 63°, as measured by using X-ray diffractiometry, the ratio of the crystalline orientation angle of the cellulose derivative phase to the crystalline orientation angle of the acrylonitrile polymer phase satisfies the requirement of the formula (1):

$$\alpha_{Cell\ Der.}/\alpha_{PAN} \leq 1 \qquad (1)$$

wherein $\alpha_{Cell\ Der.}$ stands for the crystalline orientation angle (°) of the cellulose derivative phase and $\alpha_{PAN}$ stands for the crystal orientation angle (°) of the acrylonitrile polymer phase, and wherein the dynamic loss tangent (hereinafter referred to as "tan δ" for brevity) as determined at 110 Hz and at temperatures in the range of from 40° to 220° C. preferably satisfies the requirement of the formula (2):

$$\frac{\tan \delta\ max.}{(\tan \delta)_{T=60} + (\tan \delta)_{T=200}} - 0.5 \leq 1.3 \qquad (2)$$

wherein tan δ max. stands for a maximum value of tan δ among values determined at temperatures in the range of 40° to 220° C., and $(\tan \delta)_{T=60}$ and $(\tan \delta)_{T=200}$ represent the values of tan δ determined at 60° C. and 200° C., respectively.

In accordance with still another aspect of the present invention, there is provided a process for the preparation of composite fibers comprising at least one cellulose derivative and at least one acrylonitrile polymer in which the cellulose derivative is present in the form of a dispersed phase of fine fibers in a matrix of the acrylonitrile type polymer, said process comprising spinning a composite dope composition exhibiting a flow birefringence or optical anisotropy, which comprises at least one cellulose derivative, at least one acrylonitrile polymer and a solvent capable of substantially dissolving these polymeric materials simultaneously therein.

BRIEF DESCRIPTION OF THE DRAWINGS

FIGS. 15 through 19 are diagrams illustrating the relationship between the tan $\delta$ of fibers and the temperature, in which FIGS. 15, 17 and 18 illustrate that relationship in the fibers of the present invention.

DETAILED DESCRIPTION OF THE PREFERRED EMBODIMENTS

Figure 1:
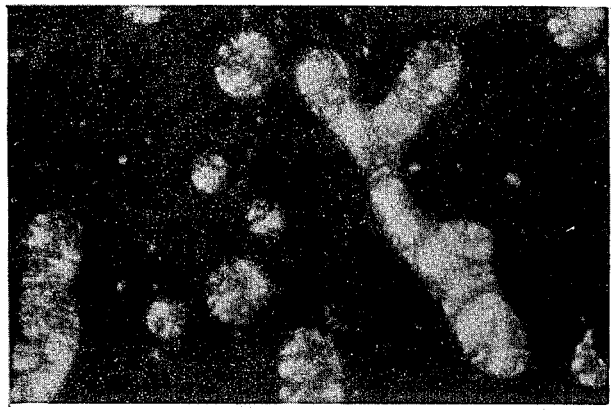
FIG. 1 is an optical micrograph (200 magnification) of a dope of the present invention, illustrated in Example 1, comprising cyanoethyl cellulose, an acrylonitrile copolymer and a 67% aqueous solution of nitric acid, which dope is allowed to stand in a crossed polarized dark visual field.

By the term "flow birefringence" used in this specification and the appended claims is meant such an optical property that when a small amount of a dope is sandwiched between a slide glass plate and a cover glass plate and is kept stationary and observed in the crossed polarized dark visual field with a microscope, the dope does not transmit light, but when the dope is similarly observed while the dope is sheared by applying a force to the cover glass plate by a finger or the like, that is, the dope is kept in the flow state under a shearing force, the dope transmits light. By the term "optical anisotropy" is meant such an optical property that, when the dope is observed in the crossed polarized visual dark field in the same manner as described above with respect to the flow birefringence, the dope transmits light not only under a shearing force, but also, in the stationary state. Those skilled in the art can easily determine whether a dope shows flow birefringence or optical anisotropy.

Various combinations of polymers and solvents capable of forming optically anisotropic dope compositions have heretofore been reported, and an optically anisotropic dope composition comprising a cellulose derivative alone as the polymer is known. For example, Japanese Patent Laid-Open Application Specification No. 96,230/77 teaches that a dope obtained by dissolving a cellulose derivative in a specific solvent at a concentration exceeding a certain critical level has an optically anisotropic characteristic. However, there has not been reported an optically anisotropic dope which comprises not only a polymer capable of exhibiting optical anisotropy, but also, a polymer incapable of exhibiting optical anisotropy. The dope of the present invention is fundamentally different from these known optically anisotropic dopes.

According to the teachings of Japanese Patent Laid-Open Application Specification No. 96,230/77, in order to form an optically anisotropic dope by dissolving cyanoethyl cellulose in dimethylformamide, the concentration should be maintained at a level of at least 35% by weight, and the obtained dope has substantially no fiber-forming property and is in the form of a gel, the measurement of the viscosity of which is impossible. In contrast, as is seen from the Examples presented hereinafter and, also, from FIG. 4, in a composite dope composition of the present invention comprising an acrylonitrile polymer, cyanoethyl cellulose and N,N-dimethylformamide, at a concentration much lower than the critical concentration disclosed in Japanese Patent Laid-Open Application Specification No. 96,230/77, that is, about 20% to about 25% by weight or higher, the dope exhibits flow birefringence or optical anisotropy, although this critical concentration varies to some extent depending upon the mixing ratio of cyanoethyl cellulose and the acrylonitrile polymer. Furthermore, the dope of the present invention has an excellent fiber-forming property and a viscosity suitable for spinning. These are the characteristic properties of the composite dope composition of the present invention. It is surprising that an optically anisotropic dope composition of the present invention can be formed by mixing an optically isotropic dope of a cellulose derivative, which is outside the scope of the invention of Japanese Patent Laid-Open Application Specification No. 96,230/77, with an optically isotropic dope of an acrylonitrile polymer dissolved in the same solvent.

When an optically anisotropic cellulose derivative dope falling within the scope of the invention of Japanese Patent Laid-Open Application Specification No. 96,230/77 is mixed with an optically isotropic dope of an acrylonitrile polymer dissolved in the same solvent, a dope of the present invention is not always obtained, but at a certain limited mixing ratio, an optically isotropic dope composition is formed. Accordingly, it will readily be understood that the dope of the present invention cannot easily be attained merely by mixing an optically anisotropic dope as disclosed in Japanese Patent Laid-Open Application Specification No. 96,230/77 with other optically isotropic dopes.

Figure 2:
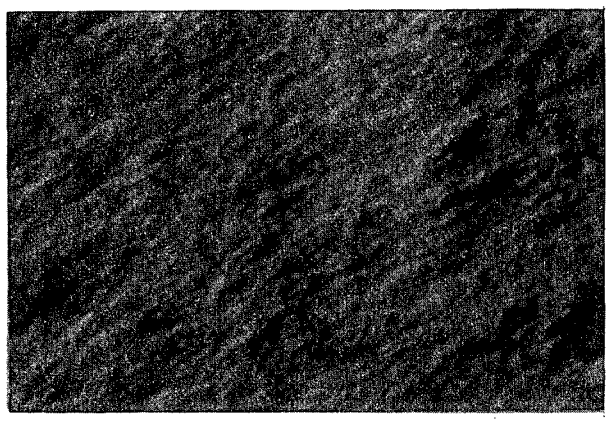
FIG. 2 is a similar optical micrograph (200 magnification) of the dope of FIG. 1, taken when a force is applied to the dope in a direction expressed by the two-heated arrow.

When the dope composition of the present invention, comprising a cellulose derivative, an acrylonitrile polymer and a solvent capable of dissolving these polymers simultaneously therein, is observed in the stationary state with a microscope, it is sometimes seen that definite phase separation takes place, as is apparent from FIG. 1, wherein white islands signify the cellulose derivative phase exhibiting an optical anisotropy and the dark sea signifies the acrylonitrile polymer phase exhibiting an optical isotropy. However, if this dope is observed by a microscope in the flow state, especially under agitation, as is seen in FIG. 2, it is seen that the entire dope exhibits an optical anisotropy. When a shaped article, for example, a fiber, prepared from this dope which exhibits as a whole flow birefringence or optical anisotropy is observed in the crossed dark visual field with a polarizing microscope, it is seen that a different phase of fine fibers is dispersed in the matrix phase. Accordingly, it is presumed that also in the above dope, there are present two different separated phases. From the results of analysis of the shaped article and other experimental results, it is construed that one phase of the dope will probably be a phase mainly comprised of the dissolved cellulose derivative and the other phase will probably be a phase mainly comprised of the dissolved acrylonitrile polymer, and that the former phase, that is, the phase mainly comprised of the dissolved cellulose derivative, will probably exhibit flow birefringence or optical anisotropy.

In conclusion, the dope composition of the present invention comprising a cellulose derivative an an acrylonitrile polymer is classified into the following three types.

(i) Neither of the polymers cause phase separation but the entire dope exhibits flow birefringence or optical anisotropy, as is seen when, for example, an aqueous solution of zinc chloride, is used as a solvent.

(ii) Phase separation takes place between the two polymers and one polymer phase alone exhibits flow birefringence or optical anisotropism.

(iii) Phase separation takes place between the two polymers and one polymer phase alone exhibits flow birefringence or optical anisotropy, but when the dope is stirred, the particles of the polymer present in the dispersed phase are finely divided, so that by microscope observation it is seen that the entire dope uniformly shows flow birefringence or optical anisotropy.

The cellulose derivative used for the preparation of the present invention has preferably a structure represented by the formula (I):

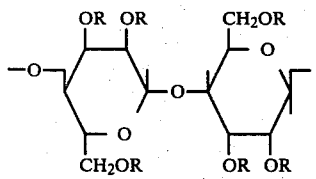

wherein R stands for a group selected from acetyl, propioyl, butyryl, stearoyl, acid phthaloyl, alkyl having 1 to 5 carbon atoms, cyanomethyl, cyanoethyl, hydroxymethyl, hydroxyethyl, hydroxypropyl, carboxymethyl and its sodium salt, carboxyethyl and its sodium salt, sodium sulfate and nitro, with the proviso that up to 4 of 6 groups R of the two glucose units of the formula (I) may be hydrogen atoms.

As specific examples of such cellulose derivatives, there can be mentioned acetyl cellulose, methyl cellulose, ethyl cellulose, cyanoethyl cellulose, methylcyanoethyl cellulose, hydroxymethyl cellulose, cyanoethylhydroxymethyl cellulose, hydroxyethyl cellulose, sodium carboxymethyl cellulose, sodium carboxyethyl cellulose, sodium methylcarboxymethyl cellulose and sodium cyanoethylcarboxymethyl cellulose. Among these, acetyl cellulose, cyanoethyl cellulose and methyl cellulose are especially preferable. Commercially available cellulose derivatives may be used as they are or after they have refined by appropriate means. Of course, cellulose derivatives specially prepared and refined by appropriate means can be used.

In the cellulose derivative used for the dope of the present invention, the average degree of substitution (DS) per anhydrous glucose unit is at least 1.0 and preferably in the range of from 1.5 to 3.0. It is ordinarily preferred that the average degree of polymerization (DP) of anhydrous glucose units in the cellulose derivative be 50 to 700, although the preferred degree of polymerization differs to some extent depending upon the particular cellulose derivative. In the present invention, the above mentioned cellulose derivatives may be used singly or in a mixture of two or more.

The acrylonitrile polymer used in the present invention includes a homopolymer of acrylonitrile and a copolymer obtained by copolymerizing at least 40 mole % of acrylonitrile with one or more other copolymerizable, monoethylenically unsaturated monomers according to customary procedures. When the dope of the present invention is used for formation of fibers, from the viewpoint of the dyeability of the resulting fibers, it is preferred to use a copolymer, especially a copolymer comprising at least 85 mole % of acrylonitrile. As specific examples of the copolymerizable monoethylenically unsaturated monomer that can be used for the manufactured of the acrylonitrile copolymers, there can be mentioned acrylamide, methacrylamide, N-methylacrylamide, N-ethylmethacrylamide, maleimide, allyl alcohol, methallyl alcohol, β-hydroxyethyl methacrylate, methallyl amine, β-aminoethyl methacrylate, acrylic acid, methacrylic acid, itaconic acid, methyl acrylate, methyl methacrylate, ethyl methacrylate, α-methylacrylonitrile, α-cyanoacrylonitrile, vinyl acetate, vinyl chloride, vinylidene chloride and styrene. Of course, the comonomers that can be used in the present invention are not limited to those exemplified above.

It is preferable that the acrylonitrile polymer used has an inherent viscosity (hereinafter referred to as "ηinh value" for brevity) of at least 0.7 as measured on a solution of 0.2 g polymer in 100 ml of N,N-dimethylformamide at 35° C.

Any solvents that can substantially dissolve the above-mentioned cellulose derivative and acrylonitrile polymer can be used. If only this requirement is satisfied, any inorganic acid type solvents, aqueous inorganic salt solution type solvents and organic solvents can be used. These solvents may be used singly or as a mixed solvent containing two or more. In order to adjust the dissolving capacity, additives such as an inorganic salt, an organic acid salt, a metal oxide and the like may be added.

As specific examples of the solvents that can be used in the present invention, there can be mentioned mineral acids, such as nitric acid, hydrochloric acid, sulfuric acid, phosphoric acid, fluorosulfonic acid and chlorosulfuric acid, and solutions formed by incorporating into such mineral acids inorganic salts, such as sodium nitrate, calcium nitrate, sodium sulfate, sodium phosphate and ammonium phosphate; aqueous solutions of inorganic salts, such as zinc chloride, rhodanates, e.g., sodium thiocyanate, potassium thiocyanate and calcium thiocyanate, magnesium chloride and calcium chloride; amide type solvents, such as N,N-dimethylformamide, N,N-dimethylacetamide, N-methyl-2-pyrrolidone, N,N,N',N'-tetramethylurea and N,N'-dimethylimidazolidinone; and dimethylsulfoxide, acetonitrile, ethylene carbonate, ethylene cyanohydrin and γ-butylolactone. These solvents may be used singly or a mixture of two or more. As the additive to be incorporated for adjusting the dissolving capacity, there can be mentioned, for example, calcium chloride, magnesium chloride, lithium chloride, sodium acetate, calcium oxide and titanium oxide. The dope of the present invention may be prepared by stirring the above-mentioned cellulose derivative and acrylonitrile type polymer in an appropriate solvent at room temperature or, if necessary, at an elevated temperature or under cooling, or by separately dissolving the cellulose derivative and the acrylonitrile type polymer in an appropriate solvent and mixing the formed solutions.

The critical dope concentration for forming a dope composition exhibiting flow birefringence or optical anisotropy differs depending on various factors, such as the kind and properties of the cellulose derivative, for example, the average degree of substitution (DS), the average degree of polymerization (DP), and the solubility, the kind and polymerization degree of the acrylonitrile polymer, the kind of the selected solvent and the dope temperature, as is illustrated in FIGS. 3 through 8 and the Examples presented hereinafter. For example, in the case of the same kind of cellulose derivatives, the higher the average degree of substitution (DS) and the average degree (DP) of polymerization, the lower the critical dope concentration for manifestation of the flow birefringence or optical anisotropy. Furthermore, the lower the dope temperature, the lower the critical dope concentration. In addition, as will readily be understood from FIGS. 3 and 4, the critical dope concentration for manifestation of the flow birefringence or optical anisotropy differs depending on the mixing ratio of the cellulose derivative and the acrylonitrile polymer, although the flow birefringence or optical anisotropy is manifested substantially irrespectively of this mixing ratio.

As will be understood from the foregoing discussion, the composition manifesting flow birefrigence or optical anisotropy cannot simply be defined by the dope concentration, but the critical dope concentration necessary for providing a dope composition showing flow birefringence or optical anisotropy can be determined case by case. For example, as is seen from FIGS. 3 through 8, when an aqueous solution of an inorganic acid such as nitric acid is used as the solvent, the dope concentration should be at least about 13% by weight, and when an amide solvent such as N-methyl-2-pyrrolidone or N,N-dimethylformamide is used as the solvent, if the cellulose derivative is acetyl cellulose, the dope concentration should be at least about 25% by weight, and if the cellulose derivative is cyanoethyl cellulose, the dope concentration should be at least about 20% by weight. Furthermore, when dimethysulfoxide is used as the solvent and the cellulose derivative is cyanoethyl cellulose, the dope concentration should be at least about 15% weight, and when a 65% by weight aqueous solution of zinc chloride is used as the solvent and the cellulose derivative is cyanoethyl cellulose, the dope concentration should be at least about 10% by weight. When 65 to 70% by weight of concentrated nitric acid is used as the solvent and the cellulose derivative is cyanoethyl cellulose, the flow birefringence is manifested at a dope concentration of about 13 to about 20% by weight, and this manifestation range is shifted to the higher dope concentration side as the mixing ratio of cyanoethyl cellulose is reduced. On the other hand, if this mixing ratio is increased, the manifestation range is shifted to the lower dope concentration side. The dope exhibiting optical anisotropy has a higher concentration than the dope concentration manifesting flow birefringence.

In many cases, the dope composition of the present invention which exhibits flow birefringence or optical anisotropy appears opaque to the naked eye, but when the dope composition is observed with a microscope, it can be confirmed that the dope comprises two separated phases, for example, an island-in-sea phase structure. However, when an aqueous concentrated solution of zinc chloride is used as the solvent, it sometimes happens that a transparent dope is formed and phase separation is not observed. Furthermore, it sometimes happens that when a certain dope which appears transparent to the naked eye is observed by a differential interference microscope or phase difference microscope, it can be confirmed that fine phase separation is caused in the dope, i.e., one of the polymers is dispersed in the form of finely divided particles in the other polymer. The fact that such dope composition exhibits flow birefringence or optical anisotropy can be confirmed by the following procedures. Namely, when a small amount of the dope is sandwiched between a slide glass plate and a cover glass plate and the dope is observed in the crossed polarized dark visual field with a microscope as it is or while the dope is sheared by applying a force to the cover glass plate by a finger or the like, it is seen that one of the two separated phases or the entire dope transmits light, as illustrated in FIG. 1 or 2.

The viscosity of the dope composition of the present invention is ordinarily at least 100 poises, as measured at room temperature, although the viscosity differs to some extend depending upon the particular solvent selected and used. The viscosity can be elevated to an appropriate level, for example, several hundred to several thousand poises, according to the intended shaped article. Incorporation of calcium carbonate, titanium oxide, a pigment, a stabilizer, a third polymer or the like is permissible, as long as attainment of the intended effects of the present invention are not inhibited. The dope compositon of the present invention is advantageous in that the viscosity can be appropriately adjusted according to the intend shaped article, for example, a fiber, a film or a fibrid.

When the dope concentration is elevated beyond the critical dope concentration for manifestation of flow birefringence or optical anisotropy, the viscosity of the dope composition is increased but optical properties are not substantially changed, and finally, a highest dope concentration where the cellulose derivative and acrylonitrile polymer cannot be dissolved any more is attained. Accordingly, when the dope composition is used for shaping, the viscosity of the dope is maintained at a level appropriate for shaping, for example, up to tens of thousands of poises, preferably up to 10,000 poises, especially preferably several hundred to several thousand poises. In many cases, the dope concentration is ordinarily adjusted to less than about 50% by weight, preferably about 5 to 40% by weight.

The dope composition of the present invention can be formed into fibers, films, fibrids and other shaped articles.

As pointed out hereinbefore, Cates: J. Polymer Sci., 20, 155(1966), Japanese Patent Publication No. 968/56, Japanese Patent Publication No. 2,986/62, Japanese Patent Publication No. 14,029/64 and Japanese Patent Publication No. 4,023/58 teach that phase separation takes place in a dope formed by dissolving a cellulose derivative and an acrylonitrile type polymer in a solvent. Furthermore, these references disclose that fibers in which the cellulose derivative is dispersed in the acrylonitrile polymer matrix are prepared from such dope. Indeed, in the fibers obtained according to such known techniques, attainment of certain effects is recognized. For example, the fibers can be dyed with ordinary dyes for cellulose fibers and the moisture absorbing property is improved. However, these fibers fail to satisfy the micro-structure requirements specified in the present invention, and the thermal dimensional stability and mechanical properties, such as the initial modulus, loop strength and elongation of these fibers, are comparable or inferior to those of conventional acrylic fibers.

In the present invention, it is important that the cellulose derivative functioning as the filler in the composite fiber of the present invention be dispersed in the form of fine fibers, that the crystalline orientation angle of the acrylonitrile polymer phase be 18° to 63°, as determined according to wide angle X-ray diffractionmetry, and that the ratio of the crystalline orientation angle of the phase of the cellulose derivative to the crystalline orientation angle of the phase of the acrylonitrile polymer satisfy the requirement of the hereinbefore-mentioned formula (1).

The invention of the present invention have determined the crystalline orientation angles of fibers obtained by following the teachings of the above known references according to wide angle X-ray diffractiometry, and found that in these fibers, the crystalline orientation angle of the acrylonitrile polymer portion is sufficiently small and this portion has a high orientation, but the crystalline orientation angle of the cellulose derivative portion is extremely large and the crystalline orientation of this portion is extremely low. For example, as illustrated in detail in Comparative Example 10 presented hereinafter, in the fiber comprising cyanoethyl cellulose and an acrylonitrile polymer, which is obtained according to the known process, the crystalline orientation angle of the acrylonitrile polymer portion is 29.6°, and this portion is highly oriented, but the crystal orientation angle of the cyanoethyl cellulose portion is as large as 48.0°, and the crystalline orientation of this portion is very low. In this fiber, the ratio of the crystal orientation angle of the cyanoethyl cellulose portion to the crystal orientation angle of the acrylonitrile type polymer portion is 1.62.

In the fiber of the present invention, in contrast, the crystal orientation angle of the acrylonitrile polymer phase is sufficiently small, and this portion is highly oriented, and the crystal orientation angle of the cellulose derivative phase is smaller than that of the acrylonitrile polymer phase, and this portion is more highly oriented. Therefore, the fiber of the present invention can clearly be distinguished from known fibers, such as those mentioned above, in the ratio of the crystalline orientation angle of the cellulose derivative portion to the crystalline orientation angle of the acrylonitrile polymer portion. For example, in the fiber of the present invention comprising cyanoethyl cellulose and an acrylonitrile polymer obtained in Example 32 presented hereinafter, the crystalline orientation angle of the acrylonitrile polymer portion is 28.4°, and this portion is highly oriented as in the case of the above-mentioned known fiber, but the crystal orientation angle of the cyanoethyl cellulose portion is as small as 15.1°, and this portion is highly oriented. In this fiber, the ratio of the crystal orientation angle of the cyanoethyl cellulose portion to that of the acrylonitrile polymer portion is 0.53.

As will be understood from the foregoing discussion, the known fibers comprise an acrylonitrile polymer portion having a high crystalline orientation and a cellulose derivative portion having a low crystalline orientation, whereas in the composite fiber of the present invention, the crystalline orientation of the cellulose derivative portion dispersed as a separated phase in the form of fine fibers acting as a filler is higher than the crystalline orientation of the acrylonitrile polymer matrix portion. That is, the composite fiber of the present invention has a specific micro-structure satisfying the requirement of the hereinbefore-mentioned formula (1). By virtue of this specific micro-structure, the composite fiber of the present invention can have various excellent properties. For example, the above-mentioned known fiber of Comparative Example 10 is characterized by a tensile strength of 2.1 g/d, an initial modulus of 41.4 g/d, a loop strength of 1.6 g/d and a loop elongation of 5.7%. In contrast, the composite fiber of the present invention obtained in Example 32 is characterized by a tensile strength of 4.0 g/d, an initial modulus of 59.5 g/d, a loop strength of 2.9 g/d and a loop elongation of 13.7%. Namely, the composite fiber of the present invention is greatly improved over the known fiber in mechanical properties, especially the initial modulus, the loop strength and elongation. The mechanism for attaining such reinforcing effects by the micro-structure of the fiber has not been elucidated completely, but it is believed the stress applied in the direction of the fiber axis, or a direction rectangular thereto, will be concentrated on the cellulose derivative in the form of fine fibers acting as a filler, which is more highly oriented, and is expected to be higher in strength and elongation characteristics, and dimension stability, than the acrylonitrile polymer matrix, and the stress will be thus moderated by the cellulose derivative filler. In contrast, when it is considered that fine fibers of the cellulose derivative filler are oriented to a minor extent, and unsatisfactory in the strength and elongation, and dimensional stability, the filler will readily be broken or elongated if the stress is concentrated on the filler as pointed out above, with the result that the mechanical properties of the fiber as a whole are degraded.

In order to impart an excellent thermal dimensional stability to the fiber of the present invention, it is preferred that the values of the dynamic loss tangent determined at temperatures in the range of from 40° to 220° C. satisfy the requirement of the hereinbefore-mentioned formula (2).

Figure 19:
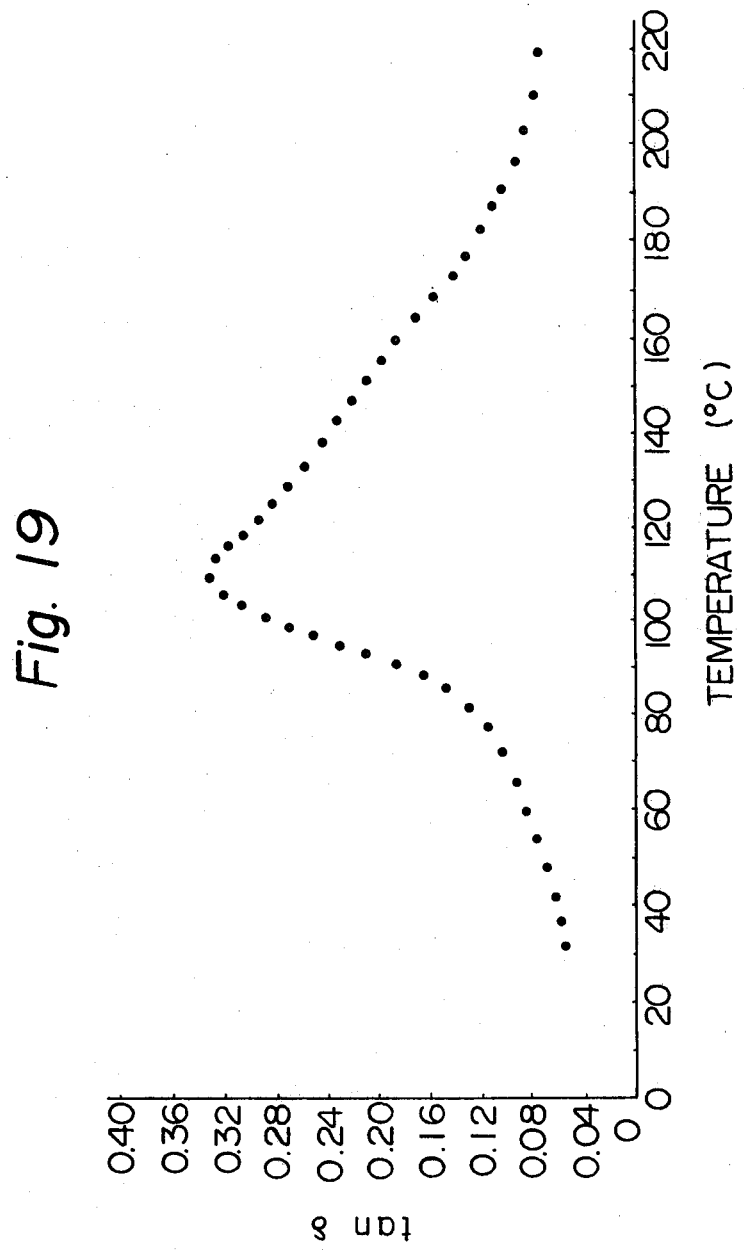

From experiments conducted by the invention of the present invention, it has been confirmed that, when the values of the dynamic loss tangent of conventional acrylic fibers obtained from any of the organic solvent system, the inorganic acid solvent system and the inorganic salt aqueous solution system are determined at temperatures in the range of from 40° to 220° C., one maximum value is observed at about 110° to about 130° C. in each fiber. It also has been confirmed that when the tan δ values of the above known composite fiber comprising a cellulose derivative and an acrylonitrile polymer are determined at temperatures in the range of from 40° to 220° C., one maximum value is observed at about 110° C. and the relation between the tan δ value and the temperature is not different from this relation in ordinary acrylic fibers, as illustrated in FIG. 19.

Figure 15:
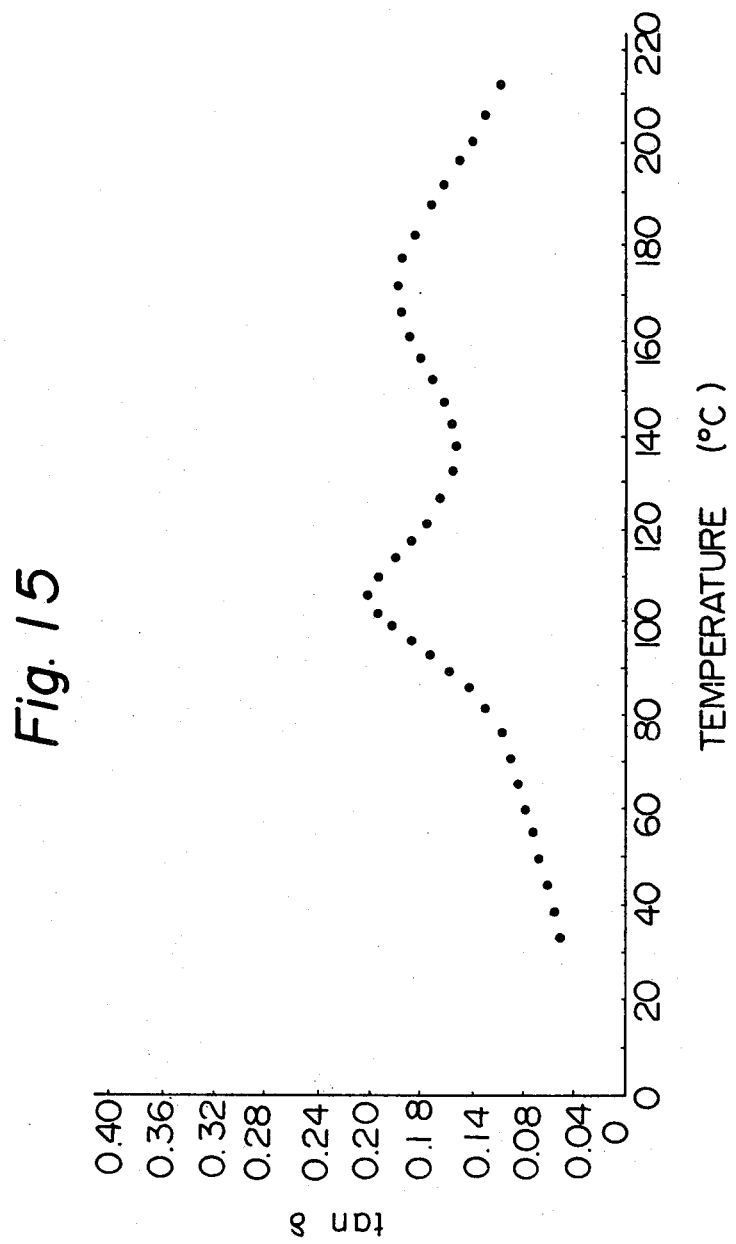

As shown in FIG. 15, when the tan δ values of the fiber of the present invention are determined at temperatures in the range of from 40° to 220° C., there appear two maximum values. In this point, the composite fiber of the present invention can clearly be distinguished from ordinary acrylic fibers and the conventional composite fibers comprising a cellulose derivative and an acrylonitrile polymer.

When the dynamic loss tangent, tan δ, which is regarded as one criterion indicating the mobility of molecules of the fiber-constituting polymer, does not satisfy the requirement of the above formula (2), the deformation under load at a high temperature is extremely large. Namely, in this case, it is impossible to impart a sufficient thermal dimensional stability to the fiber. It has been found that when the dynamic loss tangent satisfies the requirement represented by the formula (3):

$$\frac{\tan \delta \text{ max.}}{(\tan \delta)_{T=60} + (\tan \delta)_{T=200}} - 0.5 \leqq 1.0 \quad (3)$$

wherein tan δ max., $(\tan \delta)_{T=60}$ and $(\tan \delta)_{T=200}$ are as defined above in the formula (2), a highly improved thermal dimensional stability can be imparted to the fiber.

It is preferred that the cellulose derivative acting as the filler constituting the composite fiber be dispersed in the form of fine fibers. When the cellulose derivative is present in the form of extremely coarse particles or is not uniformly distributed, the effects of improving the mechanical properties and thermal dimensional stability by the combination of the cellulose derivative and acrylonitrile polymer are not prominent. It is preferred that the cellulose derivative be dispersed uniformly over the entire region of the fiber. However, a concentric or eccentric sheath-core arrangement, or a concentrated distribution of the cellulose derivative in the portion in close proximity to the peripheral surface of the fiber may be allowed, as long as the effects of the present invention are not substantially degraded.

According to the techniques developed up to the present, it is impossible to pick up the fine fibers of the cellulose derivative distributed in the composite fiber, in order to determine and specify the configuration thereof. Accordingly, only indirect determination using an optical microscope or electron microscope is possible, and it is impossible to specify the configuration and size of such fine fibers definitely. However, it is ordinarily preferred that, as illustrated in the electron micrograph (FIG. 9) appended for facilitating the understanding of the fiber of the present invention, the diameter of the fine fibers of the cellulose derivative be smaller than 1/10 of the total diameter of the composite fiber and less than one micron, and the ratio of the length to the diameter (length/diameter) in the fine fibers be at least 20.

The fiber of the present invention comprising at least one cellulose derivative and at least one acrylonitrile polymer has the above-mentioned specific dispersion structure and specific fiber micro-structure. By virtue of these structural features, the fiber of the present invention retains excellent characteristics inherent to conventional acrylic fibers, such as high optical stability, hand and feel resembling those of wool and good dyeability, and furthermore, the fiber of the present invention has high mechanical properties and is excellent in thermal dimensional stability, particularly dimensional stability under high temperature and wet conditions. Accordingly, the fiber may be used for manufacture of textile articles which are soft and excellent in resilience and resistance to hook tearing, because of its high initial modulus and loop strength and elongation. For example, the fiber of the present invention can be used advantageously for high grade woven fabrics for dresses, suits and the like, and for products for industrial use such as tents, car covers and drier canvases for paper-making.

The fiber of the present invention may be used in the form of staple fibers, tows, monofilaments and multifilaments.

The fiber of the present invention can easily be prepared with good reproducibility by procedures illustrated in the Examples presented hereinafter, which those skilled in the art can easily trace and follow. Of course, these Examples are exemplary of the process for the preparation of the fiber of the present invention. Ordinarily, the preparation is carried out while the following matters are taken into account with reference to the procedures illustrated in the Examples.

A dope exhibiting flow birefringence or optical anisotropy under conditions actually adopted for spinning is used as the dope composition. The mixing ratio of the cellulose derivative and the acrylonitrile polymer is not particularly critical. However, if the mixing ratio of the cellulose derivative is lower than about 2% by weight, based on the total weight of both the polymers, the thermal dimensional stability and mechanical properties are not sufficiently improved and good results are not obtained. Even if the mixing ratio of the cellulose derivative exceeds 50% by weight, the effects of improving the thermal dimensional stability and mechanical properties are not degraded. However, in order to impart a wool-like feel and touch inherent to acrylic fibers to the fiber of the present invention, it is preferred that the mixing ratio of the cellulose derivative be adjusted to lower than 50% by weight. Preferably, the proportion of the cellulose derivative to the acrylonitrile polymer is in the range of from about 5/95 to about 50/50 by weight.

The wet spinning, dry spinning and dry jet wet spinning methods customarily adopted in the art can be used as the spinning method. Undrawn filaments obtained by extruding the dope through a spineret are subjected to such treatments as water washing, drawing, drying and heat setting according to customary procedures.

The drawing step is important for imparting the above mentioned mechanical properties to the fiber and improving these properties. Ordinarily, the drawing step is carried out under heat, for example, in an atmosphere of steam or in a hot water bath, after washing the undrawn filaments. Alternately, the filaments may be drawn at room temperature or under heat before washing, that is, in the state where at least the coagulant solution or solvent is still in the filaments. Furthermore, the foregoing drawing methods may be adopted in combination. The drawing operation may be performed in two or more stages, or after undrawn filaments or drawn filaments are dried once, they may be drawn again. When a fiber containing the cellulose derivative at a relatively high mixing ratio is prepared, it is often difficult to sufficiently draw washed but undrawn filaments by one-stage drawing. In this case, it is preferred that the unwashed filaments be drawn in the state where the coagulant solution or solvent is still in the filament or the filaments be drawn in two or more stages, or both these drawing procedures be adopted in combination. The draw ratio is ordinarily selected within the range of 5 to 15, based on the undrawn filaments, as in case of ordinary acrylic fibers.

The drying step for densifying the texture may be carried out in an atmosphere maintained at a temperature which is high enough to sufficiently evaporate and remove water contained in the filaments. Ordinarily, it is preferred that the drying step be carried out at a temperature of 50° to 200° C. If the drying temperature is too high, decomposition is caused in the cellulose derivative or acrylonitrile polymer constituting the fiber, and discoloration of the fiber, therefore, is readily caused to occur.

The so drawn and dried fiber may be subjected to the final processing step, but ordinarily, the fiber is subjected to various finishing treatments, as in case of ordinary fibers. Among these finishing treatments, the relaxation heat treatment is important. This relaxation heat treatment is carried out under dry heating, wet heating or steam heating, under conditions allowing appropriate shrinkage, ordinarily a shrinkage of 5 to 40%, so as to improve the fibrillation resistance and spinning adaptability of the final fiber. The attaining of the objects of the present invention is not influenced by adoption of steps after the spinning step or conditions adopted in these steps.

The birefringence value ($\Delta n$) of the fiber of the present invention can be increased remarkably over the $\Delta n$ values of fibers obtained from the known optically isotropic dopes. A large $\Delta n$ value contributes to enhance the mechanical properties, especially the initial modulus, loop strength and elongation, and thermal dimensional stability.

The Δn value of the fiber varies depending upon the particular polymer, the composition thereof and the dope-forming solvent. Even if the mixing ratio of the cellulose derivative and acrylonitrile polymer is kept constant, it sometimes happens that the Δn value varies depending upon the particular solvent used. Incidentally, the Δn value of the fiber prepared from the dope of the present invention exhibiting flow birefringence or optical anisotropy is much larger than the Δn value of the fiber prepared from the known, optically isotropic dope, if the solvent used, and the kinds and mixing ratio of the cellulose derivative and acrylonitrile type polymer are identical in the two fibers.

The present invention will now be described in detail with reference to the Examples set forth below, that by no means limit the scope of the invention. Incidentally, in these Examples, all percentages are by weight unless otherwise indicated. In these Examples, the viscosity of the dope and physical properties of the fiber obtained by spinning were determined according to the following methods.

Viscocity of Dope

The viscosity of the dope was measured by a BH type rotating viscometer (manufactured by Tokyo Keiki K. K.) with a No. 6 rotor rotating at 2 rpm.

Physical Properties of Fibers (a) Denier:

The monofilament denier was determined by using 10 monofilaments 90 mm in length and a torsion balance Model TTI (manufactured by Eiko Sangyo K. K.).

(b) Tensile strength and elongation and modulus:

Stress-strain curves were determined at a head speed of 20 mm/min and a chart speed of 200 mm/min by using monofilaments 20 mm in length and a tensile tester Model UTM-II-2 (manufactured by Toyo Baldwin K. K.), and the properties were calculated from these curves.

(c) Thermal dimensional stability:

A weight of 500 g was imposed on a 5,000-denier tow 180 mm in length so that a load of 0.1 g/d was applied to the tow and, in this state, the tow was dipped in boiling water for 10 minutes. The elongation ratio was measured.

(d) Crystalline orientation angle:

The measurement of the crystalline orientation angle was carried out by using a photographic method according to customary procedures. For example, the crystalline orientation angle was determined according to the following procedures in the case of the counter method.

The measurement was carried out by using an X-ray generator Model RU-200PL (manufactured by Rigaku Denki K. K.) with a fiber measuring device (FS-3), a goniometer (SG-9R) and a scintillation counter. The monochromatization for CuKα radiation was achieved through the use of a nickel filter.

The fiber of the present invention exhibits strong X-ray reflections due to the cellulose derivative and the acrylonitrile fiber appearing on the equatorial line. For example, the reflection in the vicinity to the point of $2\theta = 10°$ is one due to the cellulose derivative and the reflection in the vicinity to the point of $2\theta = 17°$ is one due to the acrylonitrile polymer. These two reflections were used for determination of orientation angles. Precise values of $2\theta$ were determined from curves of the diffraction intensity in the equatorial line, obtained with respect to each of the samples. The crystal orientation angles of the phase of the cellulose derivative and the phase of the acrylonitrile polymer were determined according to customary procedures by using reflections of specific $2\theta$ values inherent to the two polymers.

The X-ray generator was operated at 32 KV and 100 mA. The fiber sample was attached to the fiber measuring device in the state where monofilaments were aligned in parallel to each other. An appropriate thickness of the fiber sample is about 2 mm. The values of $2\theta$ determined by preliminary experiment were set at the goniometer. X-rays were applied vertically to the axes of the filaments aligned in parallel to one another (vertical beam transmission method). The azimuthal scanning between $-90°$ and $+90°$ was carried out while rotating the sample in a plane vertical to the X-ray beams, and the diffraction intensity was recorded on a chart. In this operation, the scanning speed $\phi 0$ was 4°/min, the chart speed was one cm/min, the time constant was 5 seconds, the collimator diameter was 2 mm and the receiving pinhole had a square shape in which the length of one side was 2 mm.

The diffraction intensity was determined by stepwise scanning instead of the above-mentioned continuous scanning.

The crystalline orientation angles (the crystalline orientation angle $\alpha_{Cell\ Der.}$ of the cellulose derivative phase and the crystalline orientation angle $\alpha_{PAN}$ of the acrylonitrile type polymer phase) were determined as follows. A horizontal line passing through $\phi = \pm 90°$ was drawn as the background. A vertical line was drawn from the apex of the peak to the base line. The median of the height of this vertical line was determined and a horizontal line passing through this median was drawn. The distance between the intersection points of this horizontal line and the diffraction intensity curve was measured and this value of the distance was converted to a value of the angle (°), and this angle value was designated as the value of the crystalline orientation angle.

The ratio of the crystalline orientation angle $\alpha_{Cell\ Der.}$ to the crystal orientation angle $\alpha_{PAN}$ ($\alpha_{Cell\ Der.}/\alpha_{PAN}$) was calculated from the so determined values of the crystalline orientation angles of the cellulose derivative phase ($\alpha_{Cell\ Der.}$) and the acrylonitrile polymer ($\alpha_{PAN}$).

(e) Relation between temperature and dynamic loss tangent (tan δ):

The tan δ value was determined according to customary procedures by using, for example, a rheovibron Model DDV-IIC (manufactured by Toyo Baldwin K. K.). The fibers were aligned so that the denier of each sample was 600 to 800 (corresponding to a yarn sectional area of 5 to $8 \times 10^{-2}$ mm$^2$), and the length of the so formed sample was adjusted to about 30 mm. The frequency adopted for the measurement was 110 Hz, and the measurement was carried out at temperatures in the range of from 40° to 220° C. The temperature was elevated at a rate of 1.0° to 1.5° C./min, and the measurement was conducted at points of intervals of 3° to 5° C. The value of tan δ was calculated according to customary procedures. Values of tan δ obtained at the respective temperatures were plotted on the ordinate, the temperatures were plotted on the abscissa and the respective points were connected to one another by smooth lines to obtain a tan δ-temperature curve.

The values of tan δ max., (tan $\delta)_{T=60}$ and (tan $\delta)_{T=200}$ were determined by reading the maximum value, and the values at 60° and 200° C. from the above tan δ-temperature curve.

(f) Birefringence (Δn):

By using a polarization microscope Model BHA-P (manufactured by Olympus Kogaku Kogyo K. K.) with an objective lens (10 magnification) and an ocular (20 magnification) (200 magnications as a whole), the retardation (mμ) and diameter (μ) of the fiber were measured with a Berek type compensator Model AH-CTP and an ocular moving micrometer Model OSM, and the Δn value was calculated by dividing the retardation by the diameter according to customary procedures.

In the fiber of the present invention, the cellulose derivative is dispersed in the form of a separate phase of fine fibers in the matrix of the acrylonitrile polymer. Accordingly, it is very difficult to determine the Δn values of the phases of the cellulose derivative and acrylonitrile polymer constituting the composite fiber, respectively. Therefore, the Δn value of the composite fiber as a whole was determined according to the above-mentioned procedures.

EXAMPLE 1 AND COMPARATIVE EXAMPLES 1 AND 2

To 124 ml of a 67% aqueous nitric acid solution having a specific gravity of 1.41 were added 15.0 g of cyanoethyl cellulose having an average degree of polymerization (hereinafter referred to as "DP" for brevity) of 330 and an average degree of substitution (hereinafter referred to as "DS" for brevity) of 2.62, and 60 g of an acrylonitrile copolymer consisting of 92 mole % of acrylonitrile and 8 mole % of methyl acrylate, and the mixture was stirred for 3 hours while maintaining the mixture at a temperature of 0° C. by cooling by an external bath, to obtain a dope having a polymer concentration of 30%. The dope was opaque because it had a dispersed phase comprised of fine island-like particles uniformly dispersed by stirring.

A small amount of this dope was sandwiched between a slide glass plate and a cover glass plate. and when the dope was observed under the crossed polarized dark visual field, only the fine island-like phase was seen to be brilliant. Thus, it was confirmed that the dope had an optically anisotropic property. The optical microscope photograph taken is shown in FIG. 1, wherein white island-like particles are the cyanoethyl cellulose phase exhibiting optical anisotropy and the dark sea portion is the acylonitrile copolymer phase exhibiting optical isotropy. When the cover glass plate was shifted in a certain direction, the island-like particles were elongated in a line in the direction along which the force was applied to the optically isotropic phase, that is, the matrix. The microscope photograph taken is shown in FIG. 2, wherein substantially the entire dope exhibits optical anisotropy. After the applied force was removed, the shaped of the linearly elongated island-like particles was gradually changed to the original shape shown in FIG. 1 with the lapse of time, and within 30 minutes the original uniform distribution of the fine island-like particles, was restored.

Figure 3:
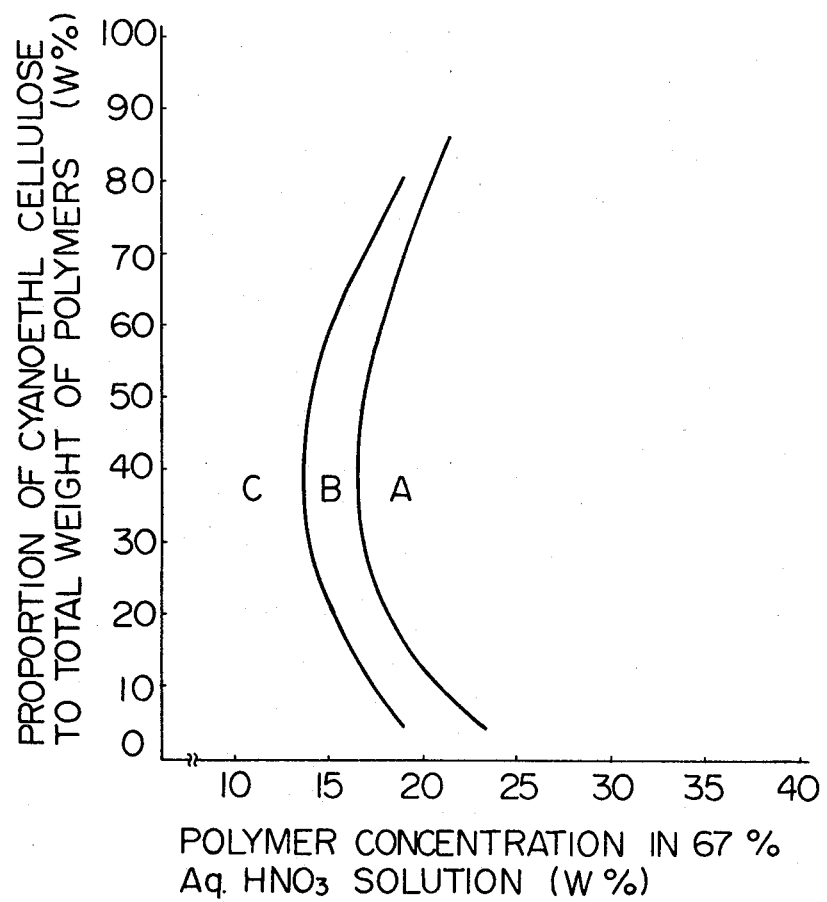
FIGS. 3 through 8 are phase diagrams of dope compositions formed by dissolving various cellulose derivatives and acrylonitrile polymers in various solvents, in each of which the region A is a region in which the dope is optically anisotropic and the region B is a region in which the dope shows a flow birefringence.

In order to examine influences of the mixing ratio of the acrylonitrile copolymer and cyanoethyl cellulose and the dope concentration on manifestation of the flow birefringence or optical anisotropy, the same cyanoethyl cellulose and acrylonitrile copolymer as described above were dissolved at a cyanoethyl cellulose percent of 5, 10, 20, 30, 40, 50, 60, 70 or 80% in the same manner as described above to form a dope having a polymer concentration of 30%. Each dope was opaque because of the island-in-sea phase separation, and the dispersed phase of island-like particles was optically anisotropic. A 67% aqueous nitric acid solution was additionally added to the dopes so that the polymer concentration was reduced stepwise by 1% every time, and manifestation of flow birefringence or optical anisotropy was checked. The obtained results are shown in FIG. 3. In FIG. 3, the region (A) is a region where the island-like fine particles exhibit optical anisotropy, the region (B) is a region where the island-like fine particles exhibit flow birefringence, and the region (C) is a region where phase separation is caused but the dope is optically isotropic. The regions (A) and (B) are included in the scope of the present invention but the region (C) is outside the scope of the present invention.

Preparation of Shaping Dopes

The dopes A and B of the present invention and the dopes C and D outside the scope of the present invention as dopes of Comparative Examples 1 and 2 were prepared by using the same cyanoethyl cellulose, acrylonitrile copolymer and 67% aqueous nitric acid solution as described above.

Dope A:

To 1,500 ml of the 67% aqueous nitric acid solution were added 105.8 g of the cyanoethyl cellulose and 423.0 g of the acrylontrile copolymer, and the mixture was stirred to form a dope having a polymer concentration of 20%. The viscosity of the dope was 2150 poises as measured at 0° C. Phase separation was observed in the dope and the disperse phase of fine island-like particles was optically anisotropic.

Dope B:

To 1,500 ml of the 67% aqueous nitric acid solution were added 80.6 g of the cyanoethyl cellulose and 322.4 g of the acrylonitrile copolymer, and the mixture was stirred to obtain a dope having a polymer concentration of 16%. When the dope was examined under the crossed polarized dark visual field in the stationary state with a microscope, it was found that the dope did not transmit light. On the other hand, when the dope was similarly examined while the cover glass plate was shifted (that is, under flow), it was found that the dope transmitted light. Thus, it was confirmed that the dope exhibited flow birefringence. The viscosity of the dope was 650 poises as determined at 0° C.

Dope C (Comparative Example 1):

To 1,500 ml of the 67% aqueous nitric acid solution were added 18.7 g of the cyanoethyl cellulose and 354.6 g of the acrylonitrile copolymer, and the mixture was stirred to form a dope having a polymer concentration of 15%. In this dope, phase separation was observed, but the dispersed phase of island-like particles was optically isotropic. The viscosity of the dope was 715 poises as measured at 0° C.

Dope D (Comparative Example 2):

To 1,500 ml of the 67% aqueous nitric acid solution was added 373.2 g of the acrylonitrile polymer, and the mixture was stirred to obtain a transparent dope having a polymer concentration of 15%. The viscosity of the dope was 805 poises as measured at 0° C.

Shaping

Each dope was transferred to a jacket-equipped dope tank, and bubbles were removed in vacuum while maintaining the dope at about 0° C. A spinneret having 100 orifices, each having a diameter of 0.08 mm, was immersed in a coagulating bath having a bath length of 1 m and consisting of a 35% aqueous nitric acid solution, and the dope was extruded into the coagulating bath through the spinneret. The filaments were wound on a first roll and washed by passing it through a water-washing bath having a bath length of 5 m. Then, the washed filaments were drawn in a boiling water bath having a bath length of 2.5 m. The conditions adopted and the obtained results are shown in Table 1, below

TABLE I

| Dope | Optical Property of Dispersed Phase of Island-like Particles | Extrusion Speed (m/min) | Winding Speed (m/min) of First Winding Roll | Maximum Draw Ratio in Boiling Water Bath |
|---|---|---|---|---|
| A | Optical anisotropy | 7.3 | 4 | 2.5 |
| B | Flow birefringence | 9.1 | 4 | 4.3 |
| C (Comparative Example 1) | Optical isotropy | 9. | 4 | 9.2 |
| D (Comparative Example 2) | — | 9.7 | 4 | 10.3 |

As is seen from the results shown in Table 1, filaments obtained from the dope D comprising the acrylonitrile copolymer alone and from the dope C exhibiting optical isotropy can be drawn in the boiling water bath at a draw ratio of about 10. On the other hand, the maximum draw ratios of filaments obtained from the dopes A and B of the present invention in the boiling water bath are 2.5 to 4.3. Accordingly, it is surprisingly seen that the filaments prepared from the dopes of the present invention show behaviors completely different from those of the filaments obtained from the conventional dopes. In the case of the filaments obtained from the dopes of the present invention, the drawing treatment necessary for imparting sufficient physical properties to filaments cannot be accomplished according to the above-mentioned method. In other words, the filaments obtained from the dopes of the present invention are very excellent in the dimensional stability under high temperature and wet conditions.

Accordingly, the filaments obtained from the dopes A and B of the present invention were sufficiently drawn according to the following procedures.

Each dope was extruded at the extrusion speed shown in Table I, above, and the obtained filaments were wound on the first roll and immediately drawn at a draw ratio of 3 in the state where the coagulating solution was still adhered to to the extruded filaments. Then, the drawn filaments were washed and drawn at a draw ratio of 2.5, in a boiling water bath, having a length of 2.5, m to obtain drawn filaments.

The so obtained filaments were dried at 70° C. by hot air and subjected to the steam heat treatment in steam maintained at 110° C. for 4 minutes. The physical properties of the obtained filaments are as shown in Table II, below. When these filaments obtained from the dopes A and B were observed with a crossed polarization microscope provided with a 530 mμ sensitized color plate, it was found that a great number of fine fibers of a phase different from that of the matrix were dispersed in parallel to the filament axis.

Separately, the dopes C and D were extruded and wound under the conditions shown in Table I, above, and the obtained filaments were drawn at a draw ratio of 7.5 in a boiling water bath. The drawn filaments were dried at 70° C. by hot air and subjected to the steam treatment at 110° C. in the same manner as described above. The physical properties of the obtained filaments are shown in Table II, below. It is seen that the filaments obtained from the dopes of the present invention had satisfactory strength and elongation, and they were very excellent in dimensional stability under high temperature and wet conditions.

TABLE II

| Dope | Filament Fineness (Denier) | Tensile Strength (g/d) | Elongation (%) | Modulus in 95° C. water Bath (g/d) | Thermal Dimensional Stability (%) |
|---|---|---|---|---|---|
| A | 3.2 | 1.8 | 29.0 | 3.6 | 8.8 |
| B | 3.2 | 1.9 | 26.3 | 2.7 | 13.6 |
| C (Comparative Example 1) | 3.3 | 3.4 | 31.6 | 1.2 | 28.5 |
| D (Comparative Example 2) | 3.3 | 3.7 | 38.4 | 0.9 | 29.1 |

EXAMPLE 2 AND COMPARATIVE EXAMPLES 3 AND 4

Cyanoethyl cellulose having a DP value of 305 and a DS value of 2.47 was mixed with the same acrylonitrile copolymer as used in Example 1 at a cyanoethyl cellulose percent of 10, 20, 30, 40 or 50%. In 130 g of N,N-dimethylformamide, 70 g of above mixture was dissolved under agitation at 50° C. to obtain a dope having a polymer concentration of 35%. Each of the so obtained dopes was thinly opaque, and when each dope was observed under the crossed polarized dark visual field with a microscope, it was seen that the dispersed phase of fine island-like particles uniformly dispersed were optically anisotropic.

Figure 4:
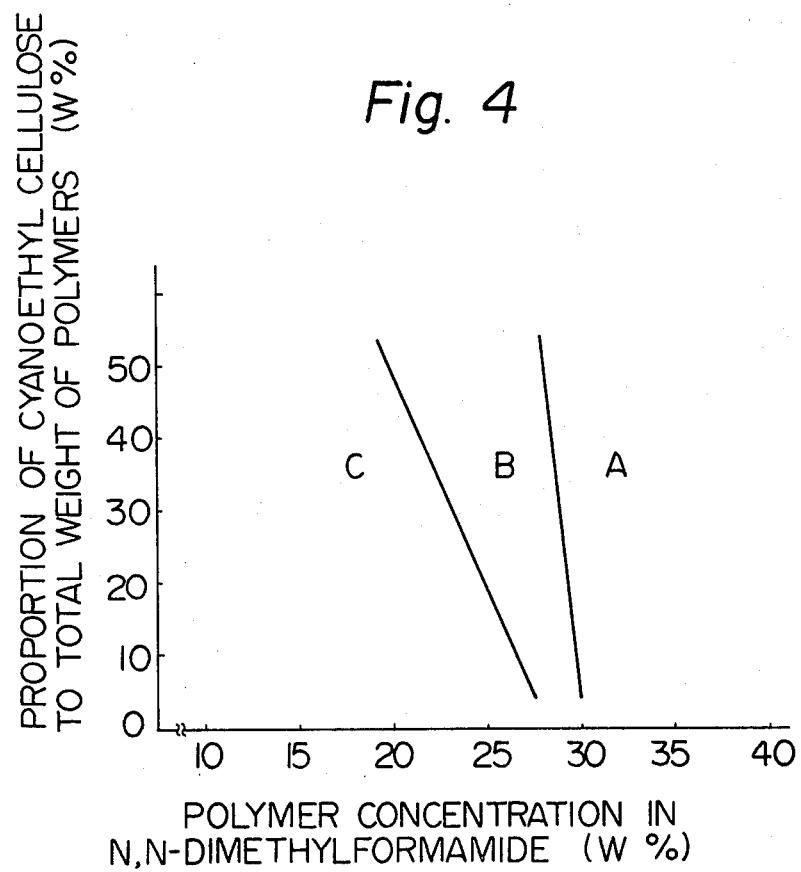

Then, N,N-dimethylformamide was additionally added to the dope stepwise by 1% every time, and manifestation of flow birefringence or optical anisotropy was confirmed in the same manner as described in Example 1. The obtained results are shown in FIG. 4. In FIG. 4, the region (A) is a region where optical anisotropy is manifested, the region (B) is a region where flow birefringence is manifested, and the region (C) is a region where optical isotropy is manifested.

Preparation of Spinning Dopes

The dope A of the present invention, the comparative dope B outside the scope of the present invention and the comparative dope C comprising cyanoethyl cellulose and N,N-dimethylformamide were prepared by using the same cyanoethyl cellulose, acrylonitrile copolymer and dimethylformamide as described above.
Dope A:
To 1,422 g of N,N-dimethylformamide were added 153 g of the cyanoethyl cellulose and 457 g of the acrylonitrile copolymer at room temperature, and the mixture was stirred to form a dope having a polymer concentration of 30%. The viscosity of the dope was 1,850 poises as measured at 29° C. The separated phase of dispersed fine island-like particles exhibited optical anisotropy.
Dope B (Comparative Example 3):
To 1,734 g of N,N-dimethylformamide were added 77.5 g of the cyanoethyl cellulose and 228.5 g of the acrylonitrile copolymer at room temperature, and the mixture was stirred to form a dope having a polymer concentration of 15%. The viscosity of the dope was 20 poises as measured at 30° C. Phase separation was observed, but the dispersed phase of fine island-like particles was optically isotropic.

Dope C (Comparative Example 4):

To 884 g of N,N-dimethylformamide was added 476 g of the cyanoethyl cellulose at room temperature, and the cyanoethyl cellulose was dissolved under violent agitation. The obtained dope was optically anisotropic, but the dope was comprised of a gel having no stringing property. The viscosity of the dope could not be measured.

speed of 7 m/min and drawn between this first roll and a second roll driven at a speed of 10.1 m/min. The obtained filaments were opaque and very brittle. Redrawing in a hot water bath was substantially impossible. The filaments were dried at 70° C. and subjected to the steam heat treatment at 100° C. The physical properties of the filaments were as shown in Table III, below. The filaments were insufficient in dimensional stability under high temperature and wet conditions, and also, in strength and elongation. Accordingly, it was judged that the fiber could not be put into practical use.

TABLE III

| Dope | Spinning Conditions | | Physical Properties of Fibers | | | | | | | |
|---|---|---|---|---|---|---|---|---|---|---|
| | Extrusion Rate (ml/min) | Extrusion Speed (m/min) | Filament Fineness (Denier) | Tensile Strength (g/d) | Elongation (%) | Modulus in 95° C. water Bath (%) | Initial Modulus (g/d) | Loop Strength (g/d) × Loop Elongation (%) | Thermal Dimensional Stability (%) | $\Delta n$ ($\times 10^{-3}$) |
| A | 3.33 | 6.62 | 2.7 | 2.7 | 20.1 | 3.3 | 57.0 | 34.5 | 10.3 | +5.61 |
| B (Comparative Example 3) | 8.34 | 5.46 | 13.0 | 0.3 | 8.3 | 0.7 | 14.0 | 2.7 | Measurement impossible because of breakage | +0.62 |
| C (Comparative Example 4) | Spinning was impossible | | | | | | | | | |

The dope C had no flowability. Therefore, the dope could not be spun. Although the separated phase of fine island-like particles of the dope A of the present invention was optically anisotropic, this dope had a viscosity of 1,850 poises, that is, the dope was suitable for spinning and furthermore, and the dope was excellent in flowability and could be handled very easily.

Shaping

The dope A was transferred to a dope tank having a capacity of 2 liters, and bubbles were removed in a vacuum at room temperature. A spinneret having 100 orifices, each having a diameter of 0.08 mm, was immersed in a bath of a 60% aqueous N,N-dimethylformamide solution having a bath length of 1 m and maintained at 30° C., and the dope was spun through the spinneret under conditions shown in Table III, below. The formed filaments were taken up on the first roll driven at a speed of 5.5 m/min and were drawn at a draw ratio of 3.1 between this first roll and a second roll driven at a speed of 17 m/min, and the drawn filaments were passed through a water washing bath having a length of 5 m to remove the coagulating solution by washing. Then, the filaments were drawn at a draw ratio of 2.1 in a boiling water bath having a length of 2.5 m. The obtained filaments were dried under relaxation by hot air maintained at 70° C. and allowed to stand in steam, maintained at 110° C., for 4 minutes, to effect the steam heat treatment under relaxation. The physical properties of the obtained filaments were as shown in Table III, below. It was found that the filaments were excellent in the dimensional stability under high temperature and wet conditions, and had satisfactory strength and elongation.

Separately, in the same manner as described above, the dope B was transferred to a dope tank having a capacity of 2 liters, bubbles were removed in vacuum and the dope was extruded into the above-mentioned coagulating bath by using a spinneret having 100 orifices, each having a diameter of 0.14 mm. The filamentary extrudate was taken up on a first roll driven at a

EXAMPLE 3

In 80 ml of a 67% aqueous nitric acid solution maintained at 0° C., 19.9 g of cyanoethyl cellulose, having a DP value of 310 and a DS value of 2.65, was dissolved to obtain a dope A having a polymer concentration of 15%. This dope was optically isotropic, and the dope did not transmit light under the polarized dark visual field. The viscosity of the dope was about 1,000 poises as measured at 0° C.

Separately, 30 g of an acrylontrile copolymer consisting of 90 mole % of acrylonitrile, 5 mole % of acrylamide, 4.5 mole % of methyl acrylate and 0.5 mole % of sodium methallylsulfonate was dissolved in 80 ml of the same aqueous nitric acid solution as used above for formation of the dope A, to obtain a dope B having a polymer concentration of 21%. The viscosity of this dope was 4,500 poises.

The dopes A and B were mixed at a weight ratio of 1/1 to obtain a dope C having a polymer concentration of 18% and a cyanoethyl cellulose content of 41.7%, based on the total weight of polymers, in which dope C an island-in-sea separated phase of the cyanoethyl cellulose was formed. The viscosity of this dope C was 1,180 poises as measured at 0° C. A small amount of this dope C was placed on a slide glass plate and when the dope was observed under the polarized dark visual field, it was found that the island-like dispersed phase transmitted light and showed optical anisotropy.

Comparative Example 5

A dope A having a polymer concentration of 26% was prepared by using the same cyanoethyl cellulose and aqueous nitric acid solution as used in Example 3. The dope was optically anisotropic, and the viscosity was 5,800 poises as measured at 0° C.

A dope B having a polymer concentration of 10% was prepared by using the same acrylontrile copolymer and aqueous nitric acid solution as used in Example 3.

The viscosity of the dope was 85 poises as measured at 0° C.

The dope A and B were mixed at a weight ratio of 10/90 to obtain a dope C having a concentration of 11.6%, in which island-in-sea phase separation was caused. Under the polarized dark visual field, the two phases did not transmit light at all. Thus, it was confirmed that the dope was optically isotropic.

EXAMPLE 4

Cellulose acetate, having a DP value of 180 and DS value of 2.50, was mixed with an acrylontrile copolymer consisting of 89 mole % of acrylontrile, 10.0 mole % of methyl acrylate and 1.0 mole % of sodium methallylsulfonate, so that the cellulose acetate mixing percent was 10, 20 or 40%. Then, 80 g of the mixture was dissolved in 120 g of N-methyl-2-pyrrolidone at 70° C. to obtain a dope having a polymer concentration of 40%. When each dope was examined with the naked eye, the dope was seen to be opaque. When the dopes were observed in the same manner as described in Example 1, it was found that each dope was optically anisotropic.

Figure 5:
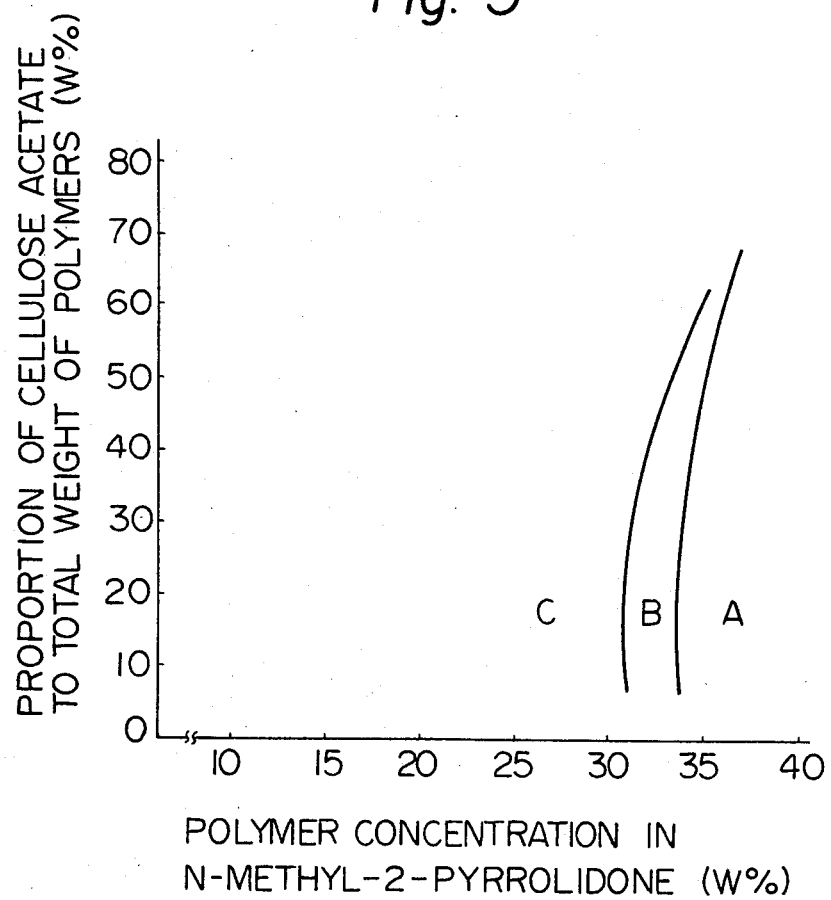

Then, N-methyl-2-pyrrolidone was gradually added and the dope concentration was gradually reduced to determine a region of dope concentrations providing dopes exhibiting flow birefringence or optical anisotropy. The obtained results are shown in FIG. 5. In FIG. 5, the region (B) is a region where flow birefringence is manifested and the region (A) is a region where optical anisotropy is manifested. Both the regions are included in the scope of the dope composition of the present invention.

EXAMPLE 5

Figure 6:
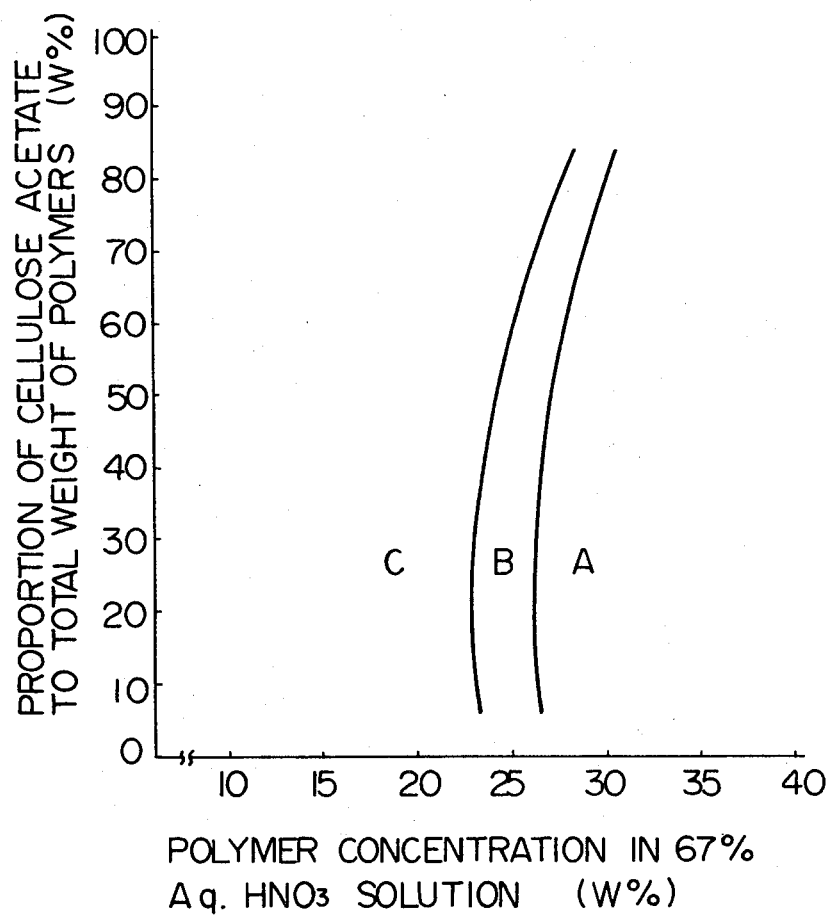

The region of dope concentration providing dopes exhibiting flow birefringence or optical anisotropy was examined in the same manner as described in Example 1, except that cellulose acetate having a DP value of 180 and a DS value of 2.48 was used instead of the cyanoethyl cellulose. The obtained results are shown in FIG. 6.

EXAMPLE 6

Figure 7:
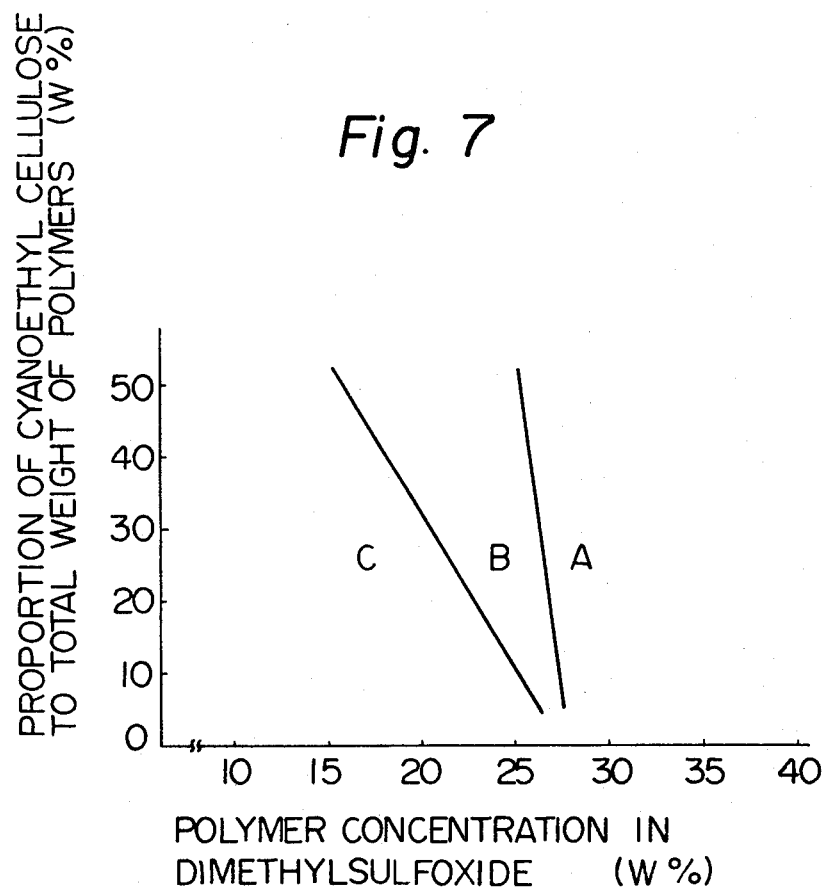

Dopes were prepared in a manner similar to that mentioned in Example 2, except that dimethylsulfoxide was used as a solvent instead of N,N-dimethylformamide. The results are shown in FIG. 7. As is seen from the comparison of FIG. 7 with FIG. 4, the minimum critical polymer concentration, at which optical anisotropy or flow birefringence is manifested, is low in the case where dimethylsulfoxide is used as a solvent, as compared with the case where N,N-dimethylformamide is used.

EXAMPLE 7

Figure 8:
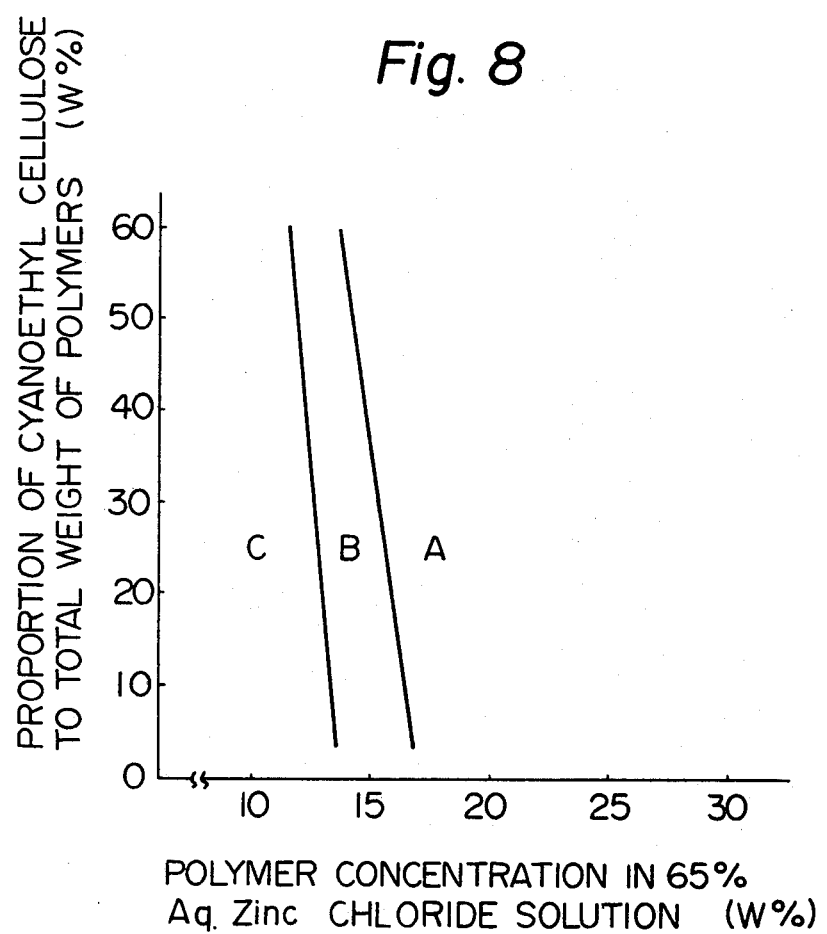

Cyanoethyl cellulose, having a DP value of 420 and a DS value of 1.85, was mixed with an acrylonitrile copolymer consisting of 97.5 mole % of acrylonitrile, 2 mole % of acrylamide and 0.5 mole % of sodium methallylsulfonate, so that the cyanoethyl cellulose mixing percent was 5, 15, 25, 35, 45 or 55%. Then, 40 g of the mixture was dissolved in 160 g of a 65% aqueous zinc chloride solution to obtain a dope having a polymer concentration of 20%. Then, the aqueous zinc chloride solution was gradually added to reduce the polymer concentration in the dope stepwise, and in the same manner as described in Example 1, the presence or absence of optical anisotropy was confirmed and a phase diagram was drawn. The obtained results are shown in FIG. 8.

EXAMPLES 8 THROUGH 30 AND COMPARATIVE EXAMPLES 6 AND 7

By using various cellulose derivatives, acrylonitrile polymers and solvents, dopes exhibiting optical anisotropy, flow birefringence and optical isotropy were prepared. The obtained results are shown in Table IV, below.

TABLE IV

| Example No. | Cellulose Derivative | Acrylonitrile Polymer | Solvent | Mixing Percent of Cellulose Derivative Based on Total Polymers (%) | Polymer Concentration in Dope (%) | Optical Property |
| --- | --- | --- | --- | --- | --- | --- |
| 8 | Cyanoethyl cellulose (DP = 550, DS = 2.87) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylacetamide | 15 | 31 | Optical anisotropy |
| 9 | Cyanoethyl cellulose (DP = 550, DS = 2.87) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylacetamide | 65 | 26 | Flow birefringence |
| 10 | Cellulose acetate (DP = 180, DS = 2.45) | Copolymer consisting of 89.5 mole % of acrylonitrile, 2.0 mole % of acrylamide, 8.0 mole % of methyl acrylate and 0.5 mole % of sodium methallylsulfonate | 65% aqueous zinc chloride solution | 40 | 25 | Optical anisotropy |
| Comparative Example 6 | Cellulose acetate (DP = 180, DS = 2.45) | Copolymer consisting of 89.5 mole % of acrylonitrile, 2.0 mole % of acrylamide, 8.0 mole % of methyl acrylate and 0.5 mole % of sodium methallylsulfonate | 65% aqueous zinc chloride solution | 40 | 12 | Optical isotropy |
| Com- | Cellulose acetate | Copolymer consisting of 89.5 | 65% aqueous zinc | 25 | 18 | Optical |

TABLE IV-continued

| Example No. | Cellulose Derivative | Acrylonitrile Polymer | Solvent | Mixing Percent of Cellulose Derivative Based on Total Polymers (%) | Polymer Concentration in Dope (%) | Optical Property |
|---|---|---|---|---|---|---|
| parative Example 7 | (DP = 180, DS = 2.45) | mole % of acrylonitrile, 2.0 mole % of acrylamide, 8.0 mole % of methyl acrylate and 0.5 mole % of sodium methallylsulfonate | chloride solution | | | isotropy |
| 11 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | 60% aqueous zinc chloride solution | 25 | 30 | Optical anisotropy |
| 12 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | Dimethylsulfoxide | 10 | 47 | Flow birefringence |
| 13 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | Dimethylsulfoxide | 30 | 47 | Flow birefringence |
| 14 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | Dimethylsulfoxide | 40 | 47 | Flow birefringence |
| 15 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylformamide | 20 | 45 | Flow birefringence |
| 16 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylformamide | 40 | 45 | Flow birefringence |
| 17 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylformamide | 60 | 45 | Flow birefringence |
| 18 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylacetamide | 10 | 42 | Flow birefringence |
| 19 | Cellulose acetate (DP = 140, DS = 2.45) | Copolymer consisting of 89.5 mole % of acrylonitrile, 2.0 mole % of acrylamide, 8.0 mole % of methyl acrylate and 0.5 mole % of sodium methallylsulfonate | N,N—Dimethylacetamide | 50 | 42 | Flow birefringence |
| 20 | Nitrocellulose (DP = 195, DS = 2.45) | Copolymer consisting of 91.5 mole % of acrylonitrile, 1.5 mole % of acrylamide, 6.5 mole % of methyl acrylate and 0.5 mole % of sodium methallylsulfonate | Dimethylsulfoxide | 55 | 53 | Flow birefringence |
| 21 | Nitrocellulose (DP = 195, DS = 2.45) | Copolymer consisting of 91.5 mole % of acrylonitrile, 1.5 mole % of acrylamide, 6.5 mole % of methyl acrylate and 0.5 mole % of sodium methallylsulfonate | N,N—Dimethylacetamide | 45 | 49 | Flow birefringence |
| 22 | Nitrocellulose (DP = 195, DS = 2.45) | Copolymer consisting of 91.5 mole % of acrylonitrile, 1.5 mole % of acrylamide, 6.5 mole | N,N—Dimethylformamide | 60 | 50 | Flow birefringence |

TABLE IV-continued

| Example No. | Cellulose Derivative | Acrylonitrile Polymer | Solvent | Mixing Percent of Cellulose Derivative Based on Total Polymers (%) | Polymer Concentration in Dope (%) | Optical Property |
|---|---|---|---|---|---|---|
| 23 | Methyl cellulose (DP = 330, DS = 2.38) | Copolymer consisting of 91.5 mole % of acrylonitrile, 1.5 mole % of acrylamide, 6.5 mole % of methyl acrylate and 0.5 mole % of sodium methallylsulfonate | 65% aqueous nitric acid solution | 30 | 27 | Optical anisotropy |
| 24 | Methyl cellulose (DP = 330, DS = 2.38) | Copolymer consisting of 91.5 mole % of acrylonitrile, 1.5 mole % of acrylamide, 6.5 mole % of methyl acrylate and 0.5 mole % of sodium methallylsulfonate | 65% aqueous nitric acid solution | 40 | 21 | Optical anisotropy |
| 25 | Methyl cellulose (DP = 330, DS = 2.38) | Copolymer consisting of 91.5 mole % of acrylonitrile, 1.5 mole % of acrylamide, 6.5 mole % of methyl acrylate and 0.5 mole % of sodium methallylsulfonate | 65% aqueous nitric acid solution | 25 | 15 | Flow birefringence |
| 26 | Ethyl cellulose (DP = 280, DS = 2.38) | Copolymer consisting of 91.5 mole % of acrylonitrile, 1.5 mole % of acrylamide, 6.5 mole % of methyl acrylate and 0.5 mole % of sodium methallylsulfonate | N,N—Dimethylformamide | 35 | 52 | Flow birefringence |
| 27 | Cellulose acetate butyrate (D = 180, DS = 2.52) | Copolymer consisting of 91.5 mole % of acrylonitrile, 1.5 mole % of acrylamide, 6.5 mole % of methyl acrylate and 0.5 mole % of sodium methallylsulfonate | 67% aqueous nitric acid solution | 15 | 20 | Flow birefringence |
| 28 | Cellulose acetate butyrate (D = 180, DS = 2.52) | Copolymer consisting of 91.5 mole % of acrylonitrile, 1.5 mole % of acrylamide, 6.5 mole % of methyl acrylate and 0.5 mole % of sodium methallylsulfonate | 67% aqueous nitric acid solution | 70 | 30 | Optical anisotropy |
| 29 | Cellulose acetate butyrate (D = 180, DS = 2.52) | Copolymer consisting of 91.5 mole % of acrylonitrile, 1.5 mole % of acrylamide, 6.5 mole % of methyl acrylate and 0.5 mole % of sodium methallylsulfonate | 67% aqueous nitric acid solution | 40 | 24 | Optical anisotropy |
| 30 | Cellulose acetate butyrate (D = 180, DS = 2.52) | Copolymer consisting of 91.5 mole % of acrylonitrile, 1.5 mole % of acrylamide, 6.5 mole % of methyl acrylate and 0.5 mole % of sodium methallylsulfonate | N,N—Dimethylacetamide | 60 | 45 | Flow birefringence |

EXAMPLE 31 AND COMPARATIVE EXAMPLE 8

To 1,500 ml of a 67% aqueous nitric acid aqueous solution were added 40.3 g of cyanoethyl cellulose having a DP value of 316 and a DS value of 2.60 and 362.7 g of an acrylonitrile copolymer having a ρinh value of 1.24 and consisting of 92 mole % of acrylonitrile and 8 mole % of methyl acrylate, and the mixture was stirred to form a dope having a polymer concentration of 16%. The viscosity of the dope was 725 poises as measured at 1.5° C. When the dope was observed by a microscope, it was found that the dope had a separated phase of fine island-like particles. When a shearing force was applied to the dope under the crossed polarized dark visual field by shifting slide glass and cover glass plates, the island-like particles were linearly elongated and they transmitted light. Accordingly, it was confirmed that the separated phase exhibited flow birefringence.

The dope was transferred to a dope tank equipped with a cooling jacket. While the dope was maintained at about 0° C., bubbles were removed in vacuum and the dope was extruded into a coagulating bath, having a bath length of 1 m and consisting of a 35% aqueous nitric acid solution, at an extrusion rate of 4.27 ml/min and an extrusion speed of 8.50 m/min, through a spinneret having 100 orifices, each having a diameter of 0.08 mm. The filamentary extrudate was wound at a speed of 4 m/min, passed through a water washing bath having a length of 5 m to effect washing, and drawn at a draw ratio of 9.9 in a boiling water bath having a length of 2.5 m to obtain drawn filaments.

Figure 9:
FIG. 9 is an electron micrograph (22,000 magnification) of an embodiment of the fiber of the present invention.
Figure 10:
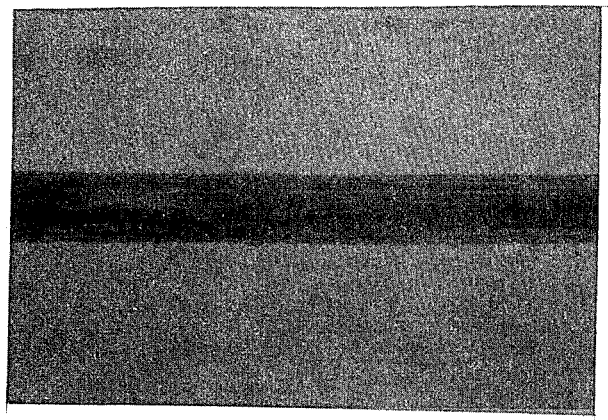
FIG. 10 is an optical micrograph (400 magnification) of the side face of the fiber shown in FIG. 9.

The drawn filaments were dried under relaxation with hot air maintained at 70° C. and, then, allowed to stand in steam maintained at 105° C. for 4 minutes to effect the steam heat treatment under relaxation. An electron microscope photograph (22,000 magnification) of the section of the fiber is shown in FIG. 9, and an optical microscope photograph (400 magnification) of the side face of the fiber is shown in FIG. 10. The ratio of the crystalline orientation angles as determined according to the wide angle X-ray diffractiometry and the physical properties of the filaments are shown in Table V. For comparison, a dope was prepared by using the same acrylonitrile copolymer as used in Example 31 alone, without using the cyanoethyl cellulose, and filaments were prepared from this dope by carrying out spinning and post treatments in the same manner as described in Example 31. The physical properties of the filaments (Comparative Example 8) are shown in Table V.

As is apparent from FIGS. 9 and 10, the filaments of the present invention have a composite structure in which phase separation is caused and the cellulose derivative, i.e., cyanoethyl cellulose, is dispersed as a separated phase in the form of fine fibers. The ratio of the crystalline orientation angle of the cyanoethyl cellulose phase to that of the acryronitrile copolymer phase was 0.81 as shown in Table V. It was confirmed that the filaments of the present invention are very much superior to the conventional acrylic fiber (Comparative Example 8) in the initial modulus, and the loop strength and elongation, and that the filaments of the present invention are excellent in thermal dimensional stability. Namely, the filaments of the present invention have high mechanical properties and a high thermal dimensional stability in combination.

EXAMPLE 32

To 1,000 ml of a 70% aqueous nitric acid solution were added 16.6 g of cyanoethyl cellulose having a DP value of 330 and a DS value of 2.62, and 315.3 g of an acrylonitrile copolymer having an $\rho inh$ value of 1.32 and consisting of 90 mole % of acrylonitrile, 5.5 mole % of acrylamide and 4.5 mole % of methyl acrylate, and the mixture was stirred to form a dope having a polymer concentration of 19%. The viscosity of the dope was 2150 poises as measured at 0° C. When the dope was observed with a microscope, it was seen that a separated phase in the form of fine island-like particles was dispersed, and when the cover glass plate was shifted by pressing with a finger under the crossed polarized dark visual field to bring about the flow state, only the island-like particles phase transmitted light. Accordingly, it was confirmed that island-like particle phase exhibited flow birefringence.

The dope was transferred to a dope tank equipped with a cooling jacket. While the dope was maintained at about 0° C., bubbles were removed in vacuum, and the dope was extruded at an extrusion rate of 4.27 ml/min and an extrusion speed of 2.78 m/min into a coagulating bath, having a length of 1 m, and consisting of a 38% aqueous nitric acid solution, through an intermediate air space of 5 mm by using a spinneret having 100 orifices, each having a diameter of 0.14 mm. The filamentary extrudate was wound by a roll driven at a speed of 4 m/min and passed through a water washing bath having a length of 5 m to effect water washing. The filaments were drawn at a draw ratio of 11.5 in a boiling water bath having a length of 2.5 m to obtain drawn filaments. The drawn filaments were dried and subjected to a steam heat treatment under the same conditions as described in Example 31.

The crystalline orientation angle of the cyanoethyl cellulose phase and acrylonitrile copolymer phase of the fiber, as determined by the X-ray diffractiometry, were 15.1° and 28.4°, respectively. It was thus confirmed that both the phases had a high orientation. The crystalline orietantion angle ratio was 0.53.

The physical properties and crystalline orientation angle ratios of this fiber and comparative fibers obtained in Comparative Example 9 and 10 are shown in Table V, below. It will readily be understood from Table V that the filaments of the present invention having a crystalline orientation angle ratio of not more than 1.0 form a very excellent composite fiber which has very high initial modulus, loop strength and elongation, and thermal dimensional stability, which are due to the fact that both the cellulose derivative, i.e., cyanoethyl cellulose in this example and acrylonitrile copolymer constituting the composite fiber, have a high orientation.

Figure 11:
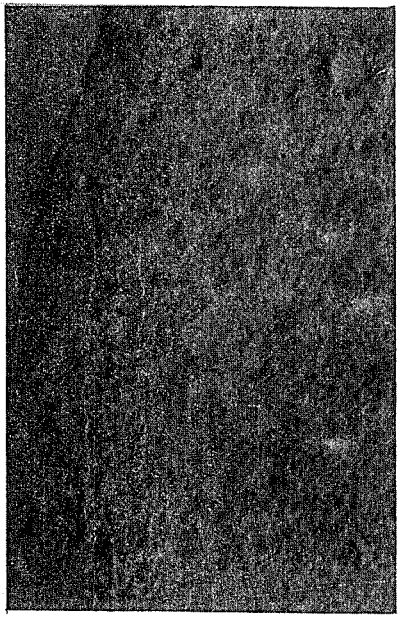
FIG. 11 is an electron micrograph (22,000 magnification) of another embodiment of the fiber of the present invention.

An electron microscope photograph (22,000 magnification) of the section perpendicular to the fiber axis of this composite fiber is shown in FIG. 11.

COMPARATIVE EXAMPLE 9

The same cyanoethyl cellulose and acrylonitrile copolymer as used in Example 32 were dissolved so that the cyanoethyl cellulose/acrylonitrile copolymer weight ratio was 20/80 and the polymer concentration was 13%, and a composite fiber was prepared from this dope by carrying out spinning and a steam heat treatment in the same manner as described in Example 32. The crystalline orientation angle ratio and physical properties of the fiber are shown in Table V, below. The fiber was different from the fiber of the present invention in the point that the crystalline orientation angle ratio was as high as 1.36. The initial modulus and loop strength and elongation of the fiber were extremely poor, because of a low orientation of the cyanoethyl cellulose portion. Furthermore, this fiber was inferrior to the fiber of the present invention in tensile strength and elongation.

Incidentally, when the dope used in this Comparative Example was examined by a microscope, it was seen that a separated phase in the form of fine island-like particles was dispersed, but even if a shearing force was applied to the dope under the crossed polarized dark visual field by shifting the slide glass and cover glass plates, the dope did not transmit light. Thus, it was confirmed that the dope did not exhibit flow birefringence or optical anisotropy.

COMPARATIVE EXAMPLE 10

To 1,620 g of dimethylsulfoxide were added 81 g of the same cyanoethyl cellulose as used in Example 32 and 324 g of the same acrylonitrile copolymer as used in Example 32, at room temperature, and the mixture was stirred to obtain a dope having a polymer concentration of 20%. The viscosity of the dope was 400 poises as measured at 27° C. By microscope observation under the polarized dark visual field, it was found that the dope was optically isotropic.

The dope was spun and subjected to a steam heat treatment in the same manner as described in Example 32, except that a 50% aqueous dimethylsulfoxide solution maintained at 50° C. was used as the coagulating bath and the draw ratio was changed to 7.5. The physical properties of the fiber and the ratio of the crystalline orientation angles of the cyanoethyl cellulose and acrylonitrile copolymer portion, as determined according to the X-ray diffractiometry, are shown in Table V, below. In this fiber, although the crystalline orientation of the acrylonitrile copolymer portion was high, the crystalline orientation of the cyanoethyl cellulose portion was low. Accordingly, this comparative fiber was considerably inferior to the fiber of the present invention in mechanical properties and thermal dimensional stability.

EXAMPLE 33

In 750 ml of a 69% aqueous nitric acid solution were dissolved 35.3 g of cellulose acetate having a DP value of 180 and a DS value of 2.50, and 317.3 g of an acrylonitrile copolymer, consisting of 91.5 mole % of acrylonitrile, 1.5 mole % of acrylamide, 6.5 mole % of methyl acrylate and 0.5 mole % of sodium methallylsulfonate, to form a dope. By microscope observation under the crossed polarized dark visual field, it was confirmed that the dope exhibited flow birefringence.

The dope was transferred to a dope tank equipped with a cooling jacket, and while the dope was maintained at about 0° C., bubbles were removed in vacuum, and the dope was extruded at an extrusion rate of 3.37 ml/min and a extrusion speed of 2.19 m/min, into a coagulating bath having a length of 1 m and consisting of a 33% aqueous nitric acid solution, through an air space of 4 mm, by using a spinneret having 100 orifices, each having a diameter of 0.14 mm. The extrudate was treated in the same manner as described in Example 31. The crystalline orientation angles of the cellulose acetate and acrylonitrile copolymer portion of the obtained fiber, and the physical properties of the fiber are shown in Table V, below. As is seen from Table V, the crystalline orientation angles of the cellulose and copolymer portions were 36.8° and 37.6°, respectively, and the crystalline orientation angle ratio was 0.98.

This fiber was excellent in the initial modulus, and loop strength and elongation, and the tensile strength of the fiber was higher than those of conventional acrylic fibers. Thus, it was confirmed that the fiber of the present invention has very high mechanical properties.

value of 316 and a DS value of 2.60, and 423.0 g of an acrylonitrile copolymer having an ηinh value of 1.24, and consisting of 92 mol % of acrylonitrile and 8 mole % of methyl acrylate, and the mixture was stirred to form a dope having a polymer concentration of 20%. The viscosity of the dope was 2,150 poises as measured at 0° C. By microscope observation, it was confirmed that a separated phase of fine island-like particles was dispersed, and under the crossed polarized dark visual field, only the island-like phase transmitted light and exhibited optical anisotropy.

The dope was transferred to a dope tank equipped with a cooling jacket, and while the dope was maintained at about 0° C., bubbles were removed in vacuum and the dope was extruded at an extrusion rate of 4.27 ml/min, and a extrusion speed of 2.78 m/min, into a coagulating bath having a bath length of 1 m and consisting of a 38% aqueous nitric acid solution, through an air space of 5 mm, by using a spinneret having 100 orifices, each having a diameter of 0.14 mm. The filamentary extrudate was taken up on a first roll driven at a speed of 4 m/min and was drawn at a draw ratio of 3.3 between this first roll and a second roll in the state where the coagulating solution still adhered to the filaments. Then, the filaments were passed through a water washing bath having a bath length of 5 m, to effect water washing, and was further drawn at a draw ratio of 3 in a boiling water bath having a length of 2.5 m. The drawn filaments were dried under relaxation in a hot air drier maintained at 70° C. and subjected to a steam heat treatment under relaxation in steam maintained at 105° C. for 4 minutes.

Figure 12:
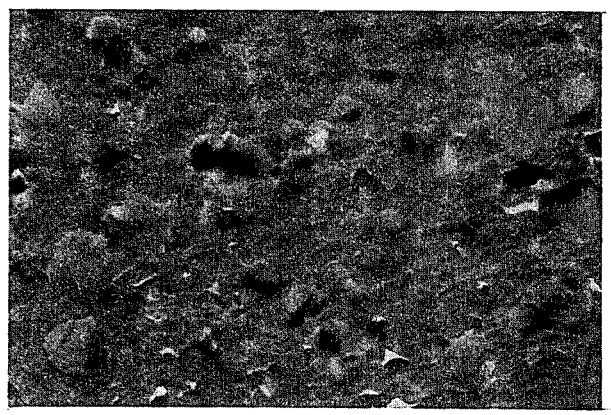
FIG. 12 is an electron micrograph (22,000 magnification) of still another embodiment of the fiber of the present invention.
Figure 13:
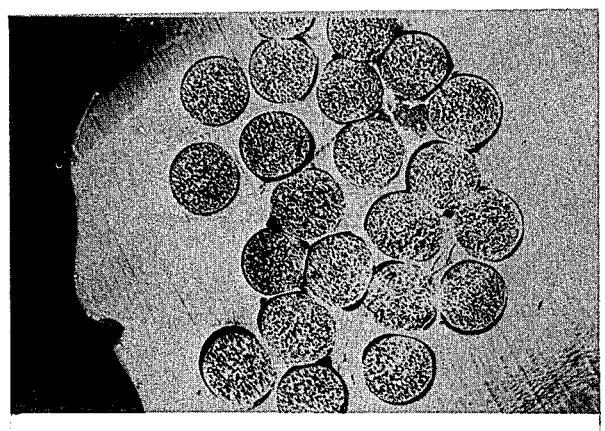
FIG. 13 is an optical micrograph (400 magnification) of the section of the fiber shown in FIG. 12.
Figure 14:
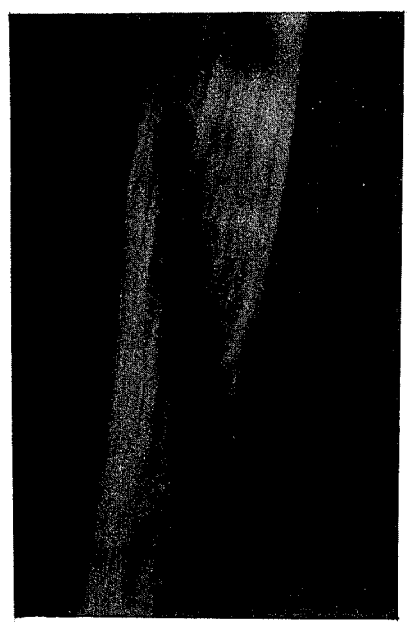
FIG. 14 is an optical micrograph (400 magnification) of the side face of the fiber shown in FIGS. 12 and 13, as taken when the fiber is crushed by the back of a single-edged razor blade.

An electron microscope photograph of the section of the obtained filament perpendicular to the filament axis is shown in FIG. 12, and optical microscope photographs of the section and side face of the filament are shown in FIGS. 13 and 14, respectively. The curve illustrating the relation between temperatures and tan δ values measured at temperatures in the range of from 40° to 220° C. is shown in FIG. 15. The physical properties of the filaments and the characteristic values of the micro-structure of the filaments obtained by the X-ray diffractiometry, and from the tan δ-temperature curve,

TABLE V

| Example No. | Physical Properties of Fibers | | | | | | Thermal Dimensional Stability (%) | Crystalline Orientation Angles | | |
|---|---|---|---|---|---|---|---|---|---|---|
| | Filament Fineness (Denier) | Tensile Strength (g/d) | Tensile Elongation (%) | Initial Modulus (g/d) | Loop Strength (g/d) | Loop Elongation (%) | | αCell Der. (°) | αPAN (°) | αCell Der./ αPAN |
| 31 | 2.7 | 3.8 | 21.8 | 62.7 | 2.4 | 12.6 | 18.3 | 26.3 | 32.4 | 0.81 |
| Comparative Example 8 | 3.3 | 3.9 | 27.9 | 40.6 | 1.6 | 3.1 | 25.1 | — | 33.7 | — |
| 32 | 2.6 | 4.0 | 22.8 | 59.5 | 2.9 | 13.7 | 19.2 | 15.1 | 28.4 | 0.53 |
| Comparative Example 9 | 3.5 | 2.8 | 18.1 | 36.9 | 1.9 | 6.1 | — | 64.4 | 47.5 | 1.36 |
| Comparative Example 10 | 4.2 | 2.1 | 21.9 | 41.4 | 1.6 | 5.7 | 29.8 | 48.0 | 29.6 | 1.62 |
| 33 | 2.4 | 5.8 | 29.0 | 61.4 | 4.0 | 10.8 | — | 36.8 | 37.6 | 0.98 |

EXAMPLE 34 AND COMPARATIVE EXAMPLE 11

To 1,500 ml of a 67% aqueous nitric acid solution were added 105.8 g of cyanoethyl cellulose having a DP are shown in Table VI, below.

TABLE VI

| Example No. | Physical Properties of Fibers | | | | Thermal Dimensional Stability (%) | Crystalline Orientation Characteristics | | | $\dfrac{\tan \delta \text{ max.}}{(\tan \delta)_{T=60} + (\tan \delta)_{T=200}} - 0.5$ |
|---|---|---|---|---|---|---|---|---|---|
| | Filament Fineness (Denier) | Tensile Strength (g/d) | Tensile Elongation (%) | 95° C. Wet Modulus (g/d) | | $\alpha$Cell Der. | $\alpha$PAN | $\alpha$Cell Der/$\alpha$PAN | |
| 34 | 2.8 | 4.1 | 17.0 | 4.1 | 11.5 | 20.2 | 34.6 | 0.58 | 0.49 |
| Comparative Example 11 | 3.4 | 3.6 | 27.9 | 0.6 | 25.2 | — | 33.7 | — | 1.47 |
| 35 | 2.7 | 3.8 | 21.8 | — | 18.3 | 26.3 | 32.4 | 0.81 | 0.85 |
| 36 | 3.2 | 2.7 | 17.1 | — | 8.4 | 55.3 | 60.5 | 0.91 | 0.37 |
| Comparative Example 12 | 4.2 | 2.1 | 21.9 | — | 29.8 | 48.0 | 29.6 | 1.62 | 1.37 |

Figure 16:
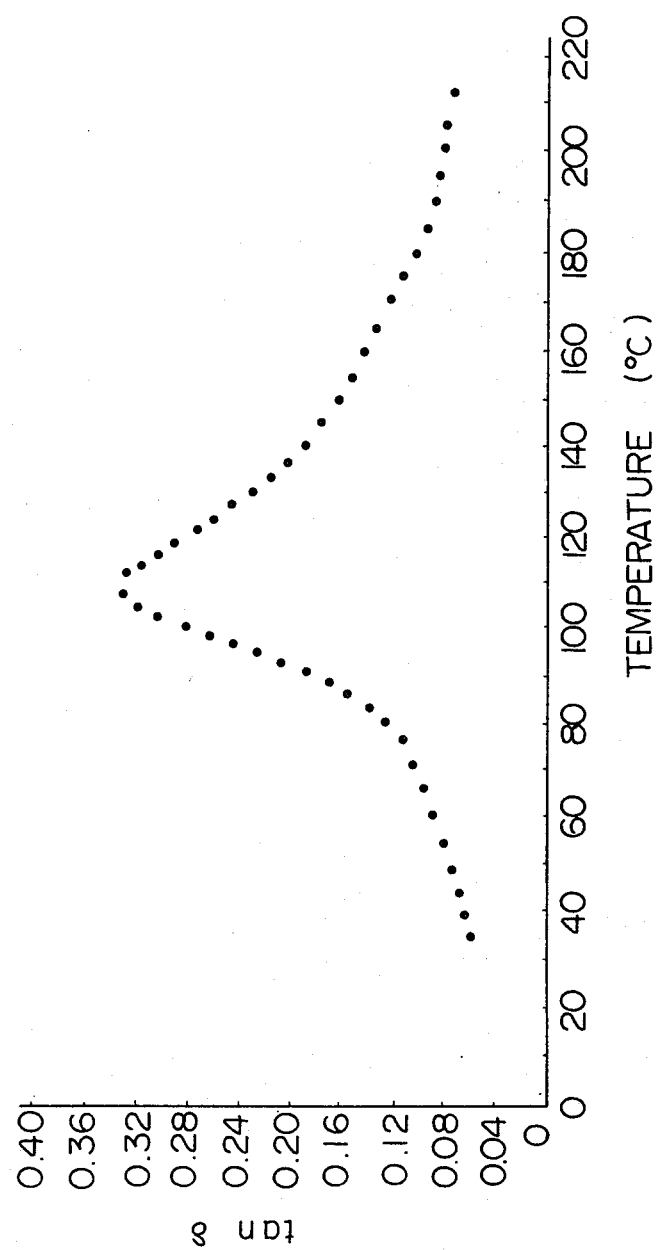

For comparison (Comparative Example 11), the properties of filaments consisting of the same acrylonitrile copolymer as used in Example 34 alone and obtained in the same manner as described in Example 34 are shown in Table VI, above. The tan δ-temperature curve of these comparative filaments is shown in FIG. 16.

The filaments of the present invention obtained in Example 34 were composite filaments in which phase separation was caused and the cellulose derivative (cyanoethyl cellulose) was dispersed as a separated phase in the form of fine fibers as illustrated in FIGS. 12, 13 and 14. The crystalline orientation angles of the cyanoethyl cellulose and acrylonitrile copolymer phases, as determined according to the X-ray diffractiometry, were 20.2° and 34.6°, respectively, and it was confirmed that both of the phases were highly oriented. The crystalline orientation angle ratio was 0.58. In the tan δ-temperature curve, the maximum value inherent to the acrylic fiber was seen at 108° C., but this maximum value was much smaller than the value of the filaments consisting solely of the acrylonitrile copolymer, and a new maximum value not observed in conventional acrylic filaments was seen at 174° C. This fact suggested that the filaments would have an excellent thermal dimensional stability. In fact, the initial modulus as determined in hot water maintained at 95° C. and thermal dimensional stability of the filaments as determined in boiling water were much higher than those of conventional acrylic filaments. Moreover, the filaments were excellent in mechanical properties represented by tensile strength and elongation. Thus, it was confirmed that the filaments of the present invention are greatly improved over conventional acrylic fibers.

EXAMPLE 35

To 1,150 ml of a 67% aqueous nitric acid solution were added 40.3 g of cyanoethyl cellulose having DP value of 316 and a DS value of 2.60, and 362.7 g of an acrylonitrile copolymer having an ηinh value of 1.31 and consisting of 92 mole % of acrylonitrile and 8 mole % of methyl acrylate, and the mixture was stirred to form a dope having a polymer concentration of 20%. The viscosity of the dope was 2,270 poises as measured at 1.5° C. By microscope observation, it was confirmed that a separated phase in the form of fine island-like particles was dispersed, and when a shearing force was applied under the crossed polarized dark visual field by shifting slide glass and cover glass plates, the island-like particles were linearly elongated and transmitted light. Thus, it was confirmed that the separated island-like phase exhibited flow birefringence.

The dope was transmitted to a dope tank equipped with a cooling jacket, and while the dope was maintained at about 0° C., bubbles were removed in vacuum, and the dope was extruded at an extrusion rate of 4.27 ml/min and an extrusion speed of 8.50 m/min into a coagulating bath, having a bath length of 1 m and consisting of a 35% aqueous nitric acid solution, by using a spinneret having 100 orifices, each having a diameter of 0.08 mm. The filamentary extrudate was wound at a speed of 4 m/min, passed through a water washing bath having a length of 5 m to effect water washing and drawn at a draw ratio of 9.9 in a boiling water bath having a length of 2.5 m to obtain drawn filaments.

Figure 17:
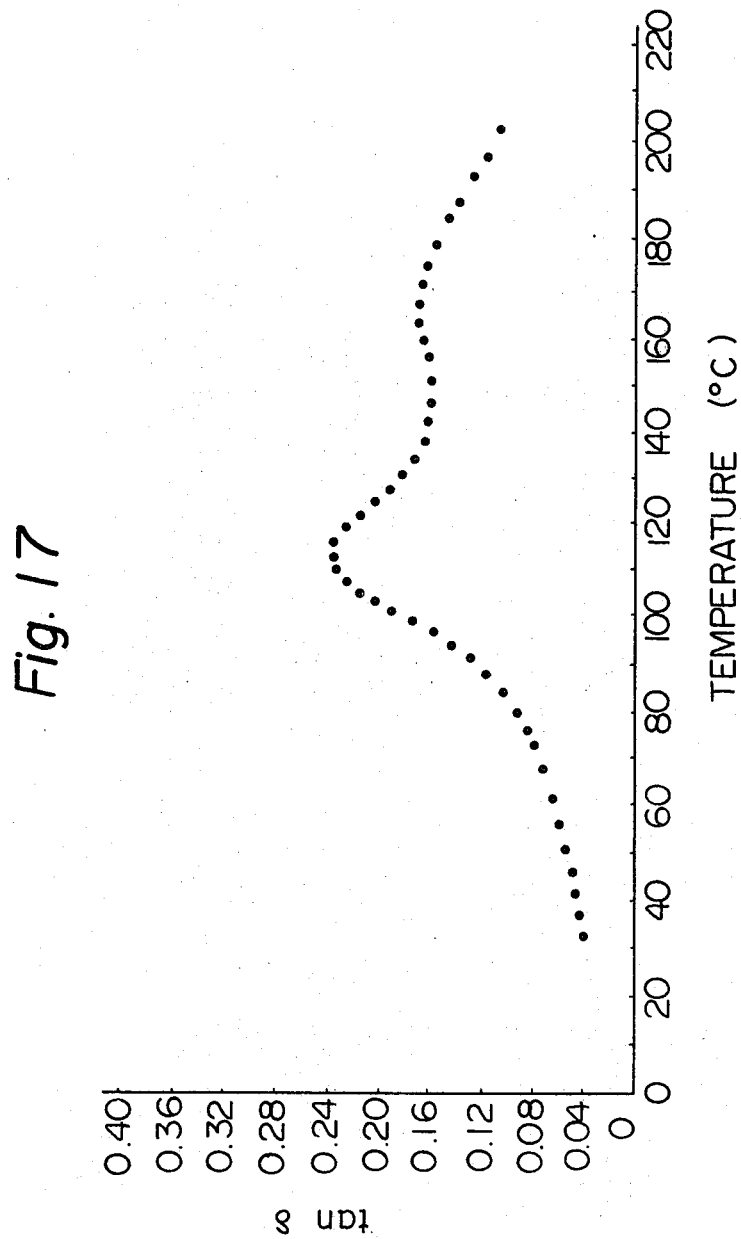

The so obtained drawn filaments were subjected to a steam heat treatment in the same manner as described in Example 34. The tan δ-temperature curve of the obtained filaments is shown in FIG. 17. The mechanical properties of the filaments, and the initial modulus as determined in hot water maintained at 95° C. and thermal dimensional stability as determined in boiling water are shown in Table VI, above.

EXAMPLE 36

To 1,380 ml of a 70% aqueous nitric acid solution were added 183.9 g of cyanoethyl cellulose having a DP of 330 and a DS value of 2.62, and 275.8 g of an acrylonitrile copolymer having a ηinh value of 1.18, and consisting of 90 mole % of acrylonitrile, 5.5 mole % of acrylamide and 4.5 mole % of methyl acrylate, and the mixture was stirred to form a dope having a polymer concentration of 19%. The viscosity of the dope was 1,500 poises as measured at −2° C. By microscope observation, it was confirmed that a separated phase in the form of fine island-like particles were dispersed and under the crossed polarized dark visual field, only the separated island-like phase transmitted light and exhibited optical anisotropy.

Figure 18:
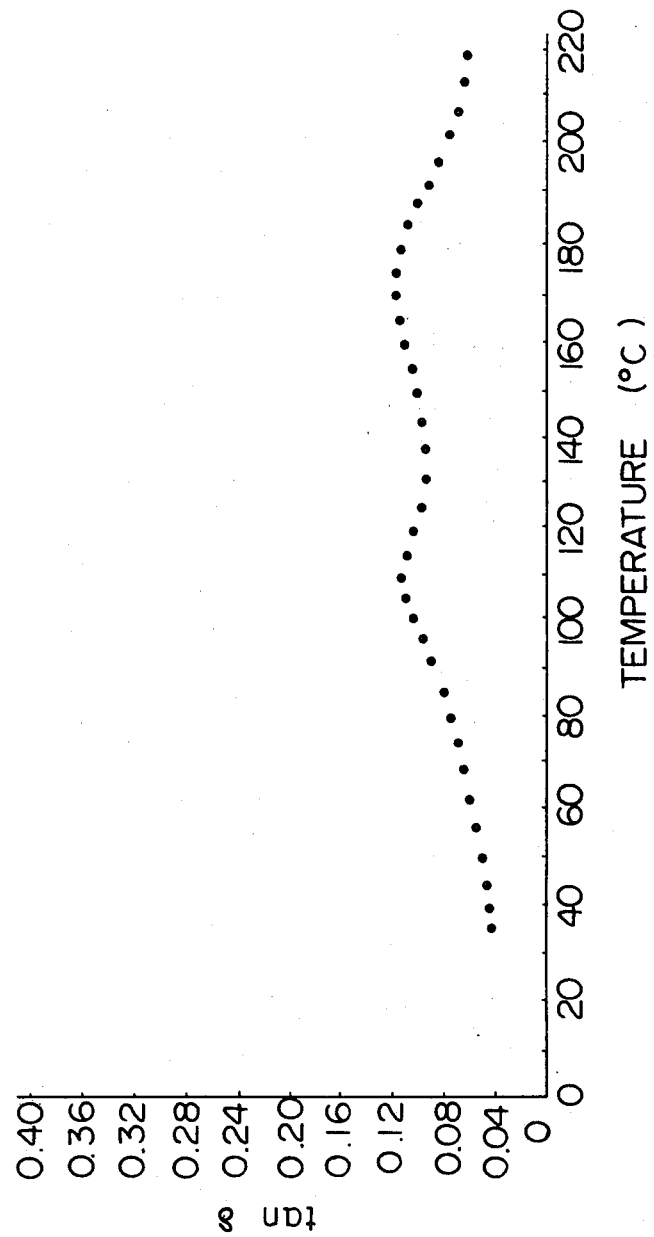

The dope was spun and drawn in the same manner as described in Example 34, and the drawn filaments were allowed to stand under relaxation in steam maintained at 110° C. for 4 minutes to obtain final filaments. The tan δ-temperature curve of these filaments is shown in FIG. 18. In this curve, the maximum value inherent to the acrylic filaments is seen at 109° C., but this value is smaller than in conventional acrylic filaments and the thermal dimensional stability is 8.4%, i.e., highly improved. Furthermore, as shown in Table VI, above, the tensile strength of the filaments is 2.7 g/d. Thus, it is seen that the filaments have satisfactory physical properties.

COMPARATIVE EXAMPLE 12

To 1,620 g of dimethylsulfoxide were added 81 g of the same cyanoethyl cellulose as used in Example 34 and 324 g of the same acrylonitrile copolymer as used in Example 34, at room temperature, and the mixture was stirred to form a dope having a polymer concentration of 20%. The viscosity of the dope was 400 poises as measured at 27° C. By microscope observation under the polarized dark visual filed, it was confirmed that the dope was optically isotropic.

The dope was spun, drawn and subjected to a steam heat treatment in the same manner as described in Example 35. The physical properties of the filaments and the ratio of the crystalline orientation angles of the cyanoethyl cellulose and acrylonitrile copolymer portions, as determined by the X-ray diffractiometry, are shown in Table VI, above. From the data, it is seen that the crystalline orientation of the acrylonitrile portion is high, but the crystalline orientation of the cyanoethyl cellulose portion is low, and therefore, the tensile strength and elongation of the filaments are insufficient. In the tan $\delta$-temperature curve of the filaments illustrated in FIG. 19, only one maximum value is seen at 110° C., as in the case of conventional acrylic filaments. Moreover, the thermal dimensional stability is 29.8% i.e., extremely poor.

EXAMPLE 37

A dope comprised of cyanoethyl cellulose, an acrylonitrile copolymer and a 67% aqueous nitric acid solution, which dope was similar to the dope A mentioned in Example 1, was transferred to a dope tank equipped with a cooling jacket. While the dope was maintained at about 0° C., bubbles were removed in vacuum, and the dope was extruded at an extrusion rate of 4.27 ml/min and an extrusion linear speed of 2.78 m/min into a coagulating bath, having a bath length of 1 m and consisting of a 38% aqueous nitric acid solution, through an air space of 5 mm, by using a spinneret having 100 orifices, each having a diameter of 0.14 mm. The filamentary extrude was taken up on a first roll driven at a speed of 4 m/min, and the filaments were drawn at a draw ratio of 3.3 between the first roll and a second roll in the state where the coagulating solution still adhered to the filaments. The drawn filaments were passed through a water washing bath having a bath length of 5 m to effect water washing and were further drawn at a draw ratio of 3 in a boiling water bath having a bath length of 2.5 m. The drawn filaments were dried under relaxation in a hot air drier maintained at 70° C., and subjected to a steam heat treatment, under relaxation for 4 minutes in steam maintained at 105° C. The mechanical properties, $\Delta n$ and thermal dimensional stability of the filaments are shown in Table VII. For comparison, also these properties of filaments (Comparative Example 13) consisting solely of the acrylonitrile copolymer and filaments (Comparative Example 14) having the same cynoethyl cellulose mixing ratio, but obtained according to a conventional method, are illustrated in Table VII, below. It is seen that the filaments of the present invention have a higher $\Delta n$ value than these comparative filaments and the filaments of the present invention are excellent over these comparative filaments in mechanical properties and thermal dimensional stability.

COMPARATIVE EXAMPLE 13

In 1,350 ml of a 67% aqueous nitric acid solution was dissolved 475.9 g of the same acrylonitrile copolymer as used in Example 37 to form a dope. The dope was spun, drawn and subjected to a steam heat treatment in the same manner as described in Example 37. The $\Delta n$ value and physical properties of the obtained filaments are shown in Table VII, below.

The dope used for formation of the filaments was transparent and optically isotropic.

COMPARATIVE EXAMPLE 14

In 2,510 ml of a 67% aqueous nitric acid solution were dissolved 105.8 g of the same cyanoethyl cellulose as used in Example 37 and 423.0 g of the same acrylonitrile copolymer as used in Example 37 to form a dope having a polymer concentration of 13%. The dope was seen to be opaque because of phase separation as in case of the dope obtained in Example 37, but by microscope observation under the polarized dark visual field, it was confirmed that the dope did not exhibit flow birefringence or optical anisotropy, but the dope was optically isotropic.

The dope was spun, drawn and subjected to a steam heat treatment in the same manner as described in Example 37. The $\Delta n$ value of the filaments was $-1.56 \times 10^{-3}$, which was much lower than that of the filaments of Example 37, that is, $+2.40 \times 10^{-3}$, and the filaments were very inferior to the filaments of Example 37 in mechanical properties and thermal dimensional stability.

EXAMPLE 38

To 1,000 ml of a 70% aqueous nitric acid solution were added 16.6 g of cyanoethyl cellulose having a DP value of 316 and a DS value of 2.60, and 315.3 g of an acrylonitrile copolymer having an $\eta$inh value of 1.34 and consisting of 90 mole % of acrylonitrile, 5.5 mole % of acrylamide and 4.5 mole % of methyl acrylate, and the mixture was stirred to form a dope having a polymer concentration of 19%. The viscosity of the dope was 2,150 poises as measured at 0° C. By microscope observation, it was confirmed that a separated phase in the form of fine island-like particles was dispersed and under the crossed polarized dark visual field, only the separated island-like phase transmitted light in the flow state brought about by pressing and shifting the cover glass plate by a finger, and exhibited flow birefringence.

The dope was transferred to a dope tank equipped with a cooling jacket. While the dope was maintained at about 0° C., bubbles were removed in vacuum and the dope was extruded, at an extrusion rate of 4.27 ml/min and an extrusion linear speed of 8.50 m/min, into a coagulating bath having a bath length of 1 m and consisting of a 35% aqueous nitric acid solution, by using a spinneret having 100 orifices, each having a diameter of 0.08 mm. The filamentary extrudate was wound at a speed of 4 m/min, passed through a water washing bath having a length of 5 m to effect water washing and drawn at a draw ratio of 9.9 in a boiling water bath having a length of 2.5 m.

The obtained filaments were dried under relaxation by hot air maintained at 70° C. and subjected to a steam heat treatment under relaxation in steam maintained at 105° C. for 4 minutes. The $\Delta n$ value and physical properties of the obtained filaments were as follows.

Filament fineness: 2.1 denier

Tensile strength: 4.3 g/d
Tensile elongation: 21.9%
Initial modulus: 62.8 g/d
Loop strength (g/d)×loop elongation (%): 17.4
Thermal dimensional stability: 19.6%
Δn: $-1.38 \times 10^{-3}$

EXAMPLE 39 AND COMPARATIVE EXAMPLE 15

In 1,307 ml of a 65% aqueous nitric acid solution were dissolved 40.3 g of cyanoethyl cellulose having a DP value of 330 and a DS value of 2.62, and 362.7 g of an acrylonitrile copolymer having an $\eta$inh value of 1.16 and consisting of 91.5 mole % of acrylonitrile, 3.5 mole % of acrylamide, 4.5 mole % of methyl acrylate and 0.5 mole % of sodium methallylsulfonate to form a dope having a concentration of 18%. It was confirmed that the dope exhibited flow birefringence at 0° C.

In 1,762 ml of a 65% aqueous nitric acid solution were dissolved 40.3 g of the same cyanoethyl cellulose as described above and 362.7 g of the same acrylonitrile copolymer as described above to form a dope having a polymer concentration of 14%. This dope (Comparative Example 15) was different from the above-mentioned dope in the point where this dope was optically isotropic.

Both the dopes were spun, drawn and subjected to the steam heat treatment in the same manner as described above. The Δn values and physical properties of the obtained filaments are shown in Table VII, below.

EXAMPLE 40

In 1,380 ml of a 70% aqueous nitric acid solution were dissolved 183.9 g of cyanoethyl cellulose having a DP value of 190 and a DS value of 2.46, and 275.8 g of an acrylonitrile copolymer having an $\eta$inh value of 1.05 and consisting of 90 mole % of acrylonitrile, 5.5 mole % of acrylamide and 4.5 mole % of methyl acrylate, and the mixture was stirred to form a dope having a polymer concentration of 19%. The viscosity of the dope was 1,500 poises as measured at $-2°$ C. By microscope observation, it was confirmed that a separated phase in the form of fine island-like particles was disperesed, and only the separated island-like phase transmitted light under the crossed polarized dark visual field and exhibited optical anisotropy.

The dope was spun and drawn in the same manner as described in Example 37 and the drawn filaments were allowed to stand under relaxation in steam maintained at 110° C. for 4 minutes to obtain final filaments. The filaments were characterized by a Δn value of $+4.61 \times 10^{-3}$, a tensile strength of 2.7 g/d and a tensile elongation of 17.1%. The thermal dimensional stability was 8.4% and thus, it was confirmed that the filaments were surprisingly excellent in the thermal dimensional stability.

EXAMPLE 41

In 750 ml of a 69% aqueous nitric acid solution were dissolved 35.3 g of cellulose acetate having a DP value of 180 and a DS value of 2.48, and 317.3 g of an acrylonitrile copolymer consisting of 92 mole % of acrylonitrile and 8 mole % of methyl acrylate to form a dope. By microscope observation under the crossed polarized dark visual field, it was confirmed that the dope exhibited flow birefringence.

The dope was transferred to a dope tank equipped with a cooling jacket. While the dope was maintained at about 0° C., bubbles were removed in vacuum and the dope was extruded, at an extrusion rate of 3.37 ml/min and an extrusion linear speed of 2.19 m/min, into a coagulating bath having a bath length of 1 m and consisting of a 33% aqueous nitric acid solution, through an air space of 4 mm, by using a spinneret having 100 orifices, each having a diameter of 0.14 mm. Then, the filamentary extrudate was treated in the same manner as described in Example 37.

The Δn value and properties of the so obtained filaments are shown below. It will readily be understood that the filaments are excellent in the initial modulus and loop strength and elongation and that the tensile strength of the filaments is higher than those of conventional acrylic fibers. In short, it is seen that the filaments of the present invention are very excellent in the mechanical properties.

Filament fineness: 2.4 denier
Tensile strength: 5.8 g/d
Tensile elongation: 29.0%
Initial modulus: 61.4 g/d
Loop strength (g/d)×loop elongation (%): 43.2
Thermal dimensional stability: 17.4%
Δn: $0.41 \times 10^{-3}$

EXAMPLE 42 AND COMPARATIVE EXAMPLE 16

In 1,634 g of dimethylsulfoxide maintained at 50° C. were dissolved 122.4 g of the same cyanoethyl cellulose as used in Example 37 and 365.6 g of the same acrylonitrile copolymer as used in Example 37 to form a spinning dope. The viscosity of the dope was 1,050 poises as measured at 50° C. It was confirmed that the dope exhibited flow birefringence.

The dope was transferred to a dope tank and bubbles were removed in vacuum, and the dope was extruded at a extrusion rate of 3.98 ml/min into a coagulating bath, having a bath length of 0.8 m and consisting of a 50% aqueous dimethylsulfoxide solution, by using a spinneret having 100 orifices, each having a diameter of 0.10 mm, while maintaining the bath temperature at 31° to 36° C. The filamentary extrudate was taken up on a first roll driven at a speed of 5.5 m/min and drawn at a draw ratio of 2.18 between the first roll and a second roll driven at a speed of 12.0 m/min. Then, the filaments were passed through a water washing bath having a bath length of 5 m to effect water washing and further drawn at a draw ratio of 3.3 in a boiling water having a bath length of 1.8 m. The drawn filaments were dried under relaxation in a hot air drier maintained at 100° C., and were subjected to a steam heat treatment under relaxation in steam maintained at 105° C. The Δn value of the filaments was $+3.94 \times 10^{-3}$. The physical properties of the filaments are shown in Table VII, below. As is seen from the data shown in Table VII, the filaments are excellent in the initial modulus, and the product of the loop strength and elongation, and the filaments have a very good thermal dimensional stability.

For comparison, the same cyanoethyl cellulose as used in Example 2 was mixed with the same acrylonitrile copolymer as used in Example 2 at the same mixing weight ratio as adopted in Example 2 (i.e., about 25/75), and the mixture was dissolved in dimethylsulfoxide so that the polymer concentration was 20% (Comparative Example 16). It was found that the obtained dope was optically isotropic. The dope was spun, drawn and treated in the same manner as described above. The Δn value and physical properties of the obtained filaments are shown in Table VII, below. It is seen from Table VII that these comparative filaments are inferior to the filaments of the present invention in mechanical properties and thermal dimensional stability.

Thermal morphological stability (%): 16.2
Δn: +1.10×10$^{-3}$

We claim:

1. A composite fiber which comprises a cellulose

TABLE VII

| Example No. | Properties of Fibers | | | | Loop Strength (g/d) × Loop Elongation (%) | Thermal Dimensional Stability (%) | Δn (× 10$^{-3}$) |
|---|---|---|---|---|---|---|---|
| | Filament Fineness (Denier) | Tensile Strength (g/d) | Tensile Elongation (%) | Initial Modulus (g/d) | | | |
| 37 | 2.8 | 4.1 | 17.0 | 71.4 | 30.6 | 11.5 | +2.40 |
| Comparative Example 13 | 3.4 | 3.6 | 27.9 | 56.0 | 5.1 | 25.2 | −3.81 |
| Comparative Example 14 | 3.5 | 2.8 | 18.1 | 36.9 | 11.6 | 32.2 | −0.56 |
| 39 | 2.7 | 4.4 | 21.8 | 66.7 | 19.3 | 14.9 | +1.73 |
| Comparative Example 15 | 2.6 | 3.7 | 19.9 | 55.1 | 9.4 | 27.0 | −1.14 |
| 42 | 3.0 | 3.9 | 18.0 | 63.3 | 27.4 | 12.9 | +3.94 |
| Comparative Example 16 | 3.2 | 3.4 | 23.2 | 46.5 | 14.8 | 25.8 | +2.48 |

EXAMPLE 43

Cyanoethyl cellulose having a DP value of 318 and a DS value of 2.66 was mixed with an acrylonitrile copolymer having an ηinh value of 1.19, and consisting of 97.5 mole % of acrylonitrile, 2 mole % of acrylamide and 0.5 mole % of sodium methallylsulfonate, so that the amount of the cyanoethyl cellulose was 5, 15, 25, 35, 45 or 55% by weight. Then, 40 g of the mixture was dissolved in 160 g of a 65% aqueous zinc chloride solution to form a dope having a polymer concentration of 20% by weight. Then, the aqueous zinc chloride solution was added to the dope and the polymer concentration in the dope was gradually reduced, and manifestation of optical anisotropy was checked in the same manner as described in Example 37 to drawn a phase diagram. The obtained results were similar to those shown in FIG. 8.

In 1,677 g of a 71% aqueous zinc chloride solution were dissolved 27.3 g of the same cyanoethyl cellulose as described above and 245.7 g of the same acrylonitrile copolymer as described above at a temperature of 60° C. to form a spinning dope having a polymer concentration of 14%. The dope as transparent, and although phase separation was not observed with the naked eye, the dope exhibited flow birefringence.

While the dope was heated at 60° C., bubbles were removed in vacuum and the dope was extruded, at an extrusion rate of 4.86 ml/min and an extrusion linear speed of 3.16 m/min, in a coagulating bath, having a bath length of 1.3 m, maintained at 4° C. and consisting of a 33.5% aqueous zinc chloride solution, through an air space of 5 mm, by using a spinneret having 100 orifices, each having a diameter of 0.14 mm. The filamentary extrudate was taken up at a speed of 4 m/min, passed through a water washing bath having a length of 5 m to effect water washing and drawn at a draw ratio of 9 in a boiling water bath having a bath length of 2.5 m. The drawn filaments were dried under relaxation at 80° C. and subjected to a steam heat treatment under relaxation in steam maintained at 108° C. The Δn value and physical properties of the so obtained filaments were as follows:

Filament fineness: 3.3 denier
Tensile strength: 3.8 g/d
Tensile elongation: 23.3%
Initial modulus: 63.9 g/d
Loop strength (g/d)×loop elongation (%): 20.4 derivative and an acrylonitrile polymer, wherein the cellulose derivative is present in the form of a dispersed phase of fine fibers in a matrix of the acrylonitrile polymer, the crystalline orientation angle of the acrylonitrile polymer phase is in the range of from 18° to 63° as measured by the wide angle X-ray diffractiometry, the ratio of the crystalline orientation angle of the cellulose derivative phase to the crystalline orientation angle of the acrylonitrile polymer phase satisfies the requirement of the formula (1):

$$\alpha_{Cell\ Der.}/\alpha_{PAN} \leq 1 \qquad (1)$$

wherein $\alpha_{Cell\ Der.}$ stands for the crystalline orientation angle (°) of the cellulose derivative phase and $\alpha_{PAN}$ stands for the crystalline orientation angle (°) of the acrylonitrile polymer phase.

2. The fiber according to claim 1, wherein the proportion of the cellulose derivative to the acrylonitrile polymer is in the range of from about 5/95 to about 50/50 by weight.

3. The fiber according to claim 1, or 2, wherein the dynamic loss tangent of the fiber as determined at 110 Hz and at temperatures in the range of from 40° to 220° C. satisfies the requirement of the formula (2):

$$\frac{\tan \delta\ max.}{(\tan \delta)_{T=60} + (\tan \delta)_{T=200}} - 0.5 \leq 1.3 \qquad (2)$$

wherein tan δ max. stands for maximum value of tan δ among values determined at temperatures in the range of from 40° to 220° C., and $(\tan \delta)_{T=60}$ and $(\tan \delta)_{T=200}$ represent the values of tan δ determined at 60° C. and 200° C., respectively.

4. The fiber according to claim 1 or 2, wherein the dynamic loss tangent of the fiber as determined at 110 Hz and at temperature in the range of from 40° to 220° C. satisfies the requirement of the formula (3):

$$\frac{\tan \delta\ max.}{(\tan \delta)_{T=60} + (\tan \delta)_{T=200}} - 0.5 \leq 1.0 \qquad (3)$$

wherein tan δ max. stands for a maximum value of tan δ among values determined at temperatures in the range of from 40° to 220° C., and $(\tan \delta)_{T=60}$ and $(\tan \delta)_{T=200}$ represent the values of tan δ determined at 60° C. and 200° C., respectively.

5. The fiber according to claim 1 or 2, wherein the cellulose derivative has a recurring unit represented by the formula (I):

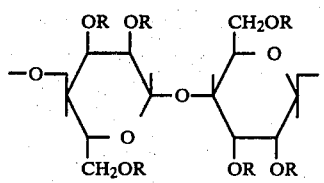

wherein R stands for a group selected from acetyl propioyl, butyryl, stearoyl, acid phthaloyl, alkyl having 1 to 5 carbon stoms, cyanomethyl, cyanoethyl, hydroxymethyl, hydroxyethyl, hydroxypropyl, carboxymethyl and its sodium salt, carboxyethyl and its sodium salt, sodium sulfate and nitro, with the proviso that up to 4 to 6 groups R of the two glucose units of the formula (I) may be hydrogen atoms.

6. The fiber according to claim 1 or 2, wherein the cellulose derivative has an average degree of substitution per anhydrous glucose unit, of at least 1.0.

7. The fiber according to claim 1 or 2, wherein the cellulose derivative has an average degree of substitution per anhydrous glucose unit, of from 1.5 to 3.0.

8. The fiber according to claim 1 or 2, wherein the average degree of polymerization of anhydrous glucose units in the cellulose derivative is in the range of from 50 to 700.

9. The fiber according to claim 1 or 2, wherein the acrylonitrile polymer is an acrylonitrile homopolymer or a copolymer comprised of at least 40% by mole of acrylonitrile and not more than 60% by mole of one or more other copolymerizable, monoethylenically unsaturated monomers.

10. The fiber according to claim 1 or 2, wherein the acrylonitrile polymer has an inherent viscosity of at least 0.7 as measured on a solution of 0.2 g polymer in 100 ml of N,N-dimethylformamide at 35° C.

* * * * *